US012277751B2

(12) United States Patent
Ida et al.

(10) Patent No.: US 12,277,751 B2
(45) Date of Patent: Apr. 15, 2025

(54) IMAGE PROCESSING APPARATUS, LEARNING APPARATUS, INFERENCE APPARATUS, AND IMAGE PROCESSING METHOD

(71) Applicant: KABUSHIKI KAISHA TOSHIBA, Tokyo (JP)

(72) Inventors: Takashi Ida, Kawasaki Kanagawa (JP); Toshiyuki Ono, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 358 days.

(21) Appl. No.: 17/930,755

(22) Filed: Sep. 9, 2022

(65) Prior Publication Data

US 2023/0252762 A1 Aug. 10, 2023

(30) Foreign Application Priority Data

Feb. 10, 2022 (JP) ................................. 2022-019857

(51) Int. Cl.
*G06V 10/77* (2022.01)
*G06V 10/26* (2022.01)
(Continued)

(52) U.S. Cl.
CPC .......... *G06V 10/7715* (2022.01); *G06V 10/26* (2022.01); *G06V 10/751* (2022.01); *G06V 10/774* (2022.01); *G06V 10/82* (2022.01)

(58) Field of Classification Search
CPC ... G06F 16/5854; G06F 18/24; G06V 10/757; G06N 3/049
See application file for complete search history.

(56) References Cited

U.S. PATENT DOCUMENTS 7,613,357 B2 * 11/2009 Owechko ............... G06V 10/32
382/293
8,131,107 B2 * 3/2012 Sun ......................... G06T 7/001
382/272
(Continued)

FOREIGN PATENT DOCUMENTS

CN     111950718 A     11/2020
JP     2010-128930 A     6/2010
(Continued)

OTHER PUBLICATIONS

M. Iise et al. "Attention-based Deep Multiple Instance Learning," Proc. Of 35$^{th}$ Int'l Conf. on Mach. Learning (PMLR), vol. 80, arXiv:1802.04712v4 [cs.LG], 16 pages (2018).
(Continued)

*Primary Examiner* — Yosef Kassa
(74) *Attorney, Agent, or Firm* — Finnegan, Henderson, Farabow, Garrett & Dunner, LLP

(57) ABSTRACT

According to one embodiment, an image processing apparatus incudes processing circuitry. The processing circuitry generates, for N processed images based on an input image, N being an integer equal to greater than 3, N feature amounts by performing feature amount extraction processing using a neural network, stores process data generated during the feature amount extraction processing in a memory, selects a maximum feature amount by performing two or more comparisons with M combinations among the N feature amounts, M being an integer equal to 2 or more and (N−1) or less, and releases (M−1) or less pieces of process data that correspond to (M−1) or less feature amounts not having been selected from the memory for each of the two or more comparisons.

20 Claims, 15 Drawing Sheets

(51) Int. Cl.
  *G06V 10/75*   (2022.01)
  *G06V 10/774*  (2022.01)
  *G06V 10/82*   (2022.01)

(56) References Cited

U.S. PATENT DOCUMENTS

| | | | | |
|---|---|---|---|---|
| 8,229,209 | B2* | 7/2012 | Paquier | G06F 18/24 |
| | | | | 382/160 |
| 8,401,283 | B2* | 3/2013 | Sabe | G06F 18/214 |
| | | | | 382/159 |
| 8,488,563 | B2* | 7/2013 | Qi | H04L 43/0852 |
| | | | | 370/332 |
| 8,818,103 | B2* | 8/2014 | Noguchi | G06F 16/5854 |
| | | | | 707/765 |
| 2019/0378014 | A1 | 12/2019 | Yamamoto et al. | |
| 2020/0285961 | A1 | 9/2020 | Yoshinaga et al. | |
| 2021/0073585 | A1 | 3/2021 | Chuang et al. | |
| 2021/0295110 | A1 | 9/2021 | Ida et al. | |
| 2022/0067514 | A1 | 3/2022 | Ida et al. | |

FOREIGN PATENT DOCUMENTS

| | | |
|---|---|---|
| JP | 2019-212206 A | 12/2019 |
| JP | 2020-144659 A | 9/2020 |
| JP | 2021-149355 A1 | 9/2021 |
| JP | 2022-38390 A1 | 3/2022 |

OTHER PUBLICATIONS

M. Oquab et al., "Is object localization for free?—Weakly-supervised learning with convolutional neural networks," IEEE Conf. on Computer Vision and Pattern Recognition (CVPR), pp. 685-694 (2015).

Hans Pinckaers et al., "Detection of Prostate Cancer in Whole-Slide Images Through End-to-End Training With Image-Level Labels," IEEE Trans. on Medical Imaging, vol. 40, No. 7, pp. 1817-1826, https://ieeexplore.IEEE.org/stamp/stamp.jsp?tp=&arnumber=9380553, (2021).

Japan Patent Office, Decision to Grant a Patent in JP App. No. 2022-019857, 3 pages, and machine translation, 2 pages (Jan. 14, 2025).

* cited by examiner

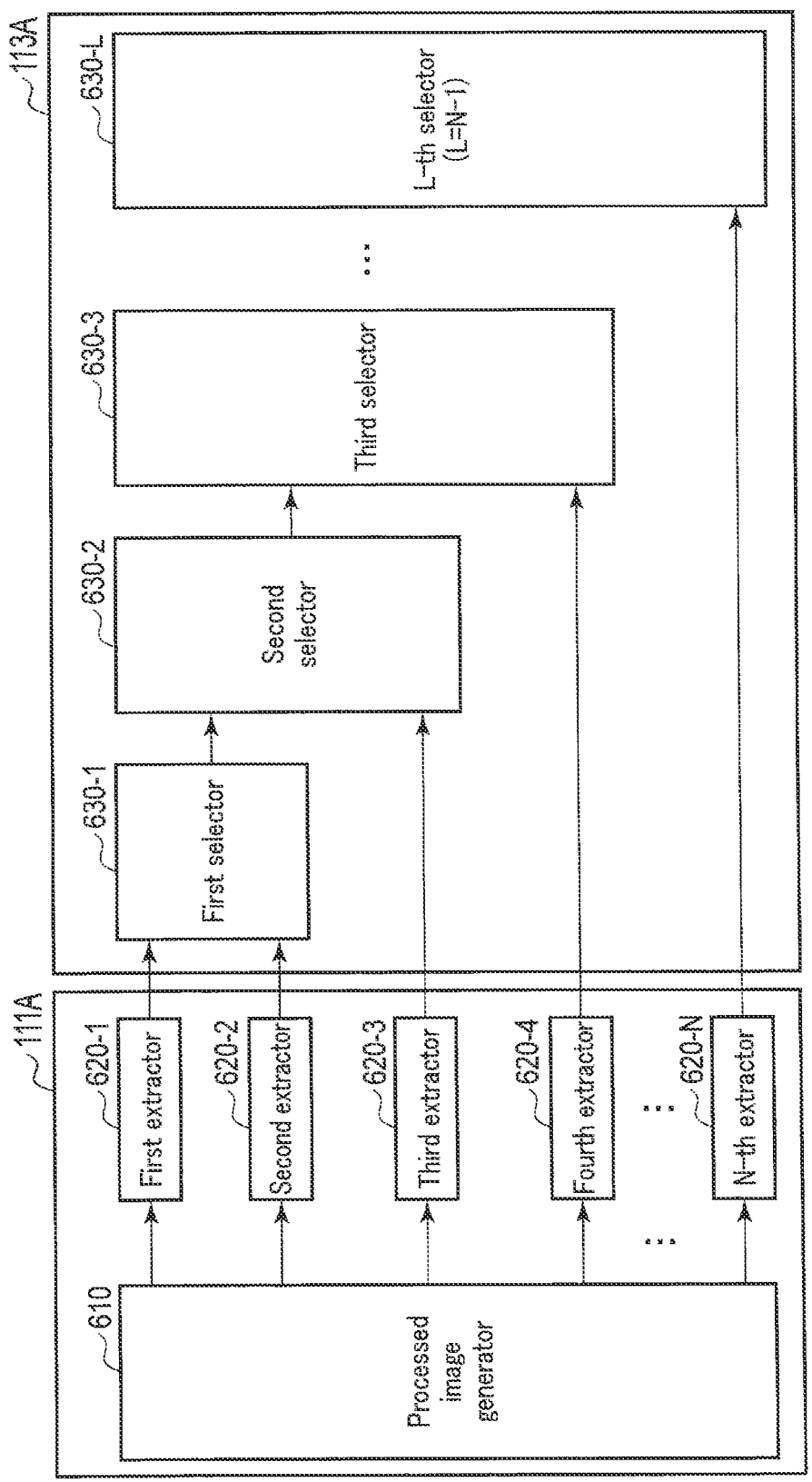
F I G. 6

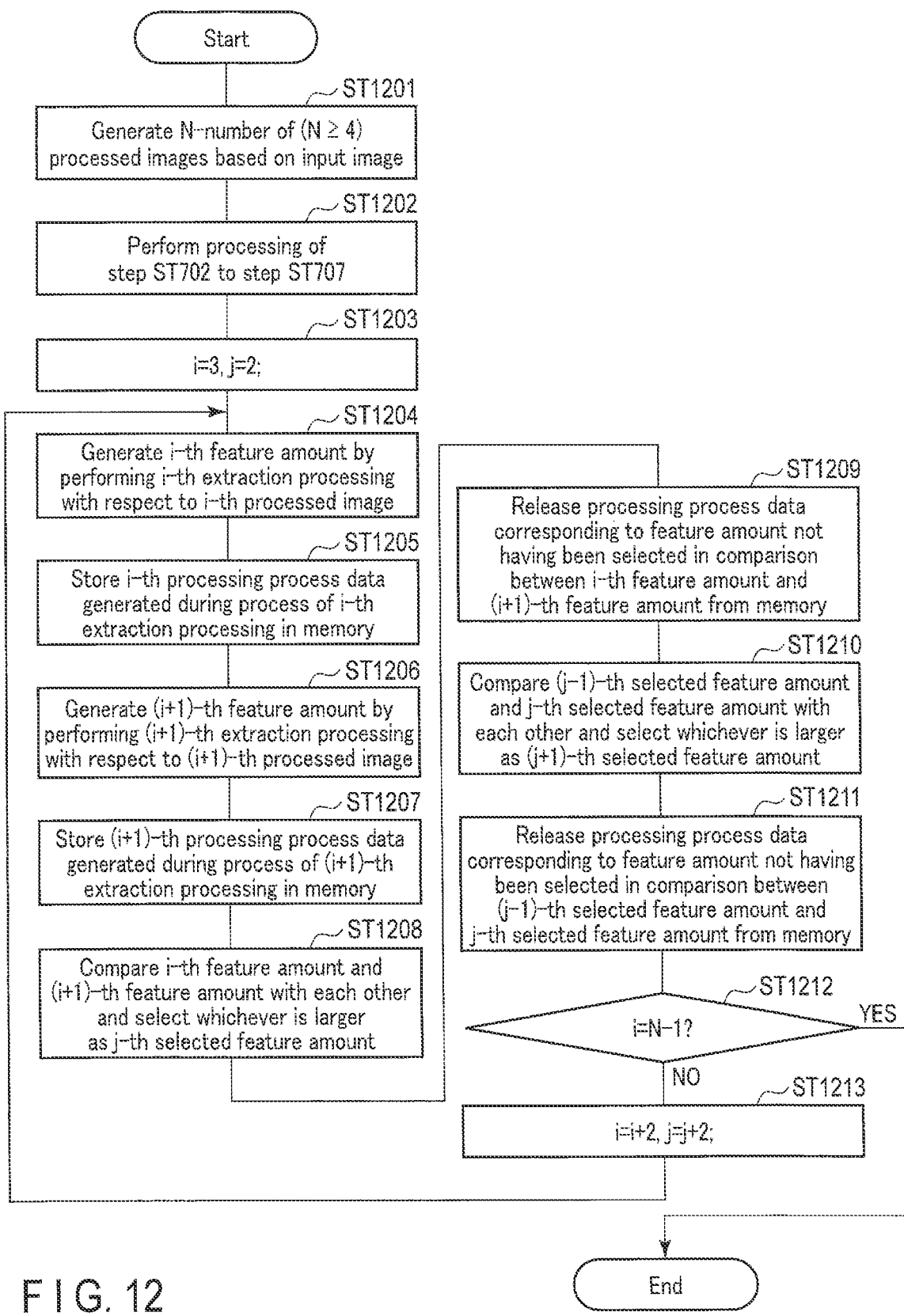
F I G. 12

IMAGE PROCESSING APPARATUS, LEARNING APPARATUS, INFERENCE APPARATUS, AND IMAGE PROCESSING METHOD

CROSS-REFERENCE TO RELATED APPLICATIONS

This application is based upon and claims the benefit of priority from Japanese Patent Application No. 2022-019857, filed Feb. 10, 2022, the entire contents of which are incorporated herein by reference.

FIELD

Embodiments described herein relate generally to an image processing apparatus, a learning apparatus, an inference apparatus, and an image processing method.

BACKGROUND

Use of a neural network for recognizing a presence or absence of an anomaly in a visual inspection using a photographed image of a manufactured article at a manufacturing facility or in medical diagnosis using a medical image such as a fluoroscopic X-ray image or a CT image is known to produce generally higher recognition accuracy than using other types of image processing. In addition, in such visual inspections and medical diagnoses, an anomaly often only appears in a very small part of an entire recognition object image. Therefore, there is a known technique that involves dividing a recognition object image into a plurality of processed images and individually processing each of the plurality of divided processed images with a neural network. Using this technique enables a processing amount of an individual neural network to be reduced to less than a processing amount in a case where the recognition object image is to be processed as it is.

Ideally, training of a neural network in the technique described above desirably uses a method of teaching a presence or absence of an anomaly in each of the plurality of processed images as a correct answer. However, with this method, there is a problem in that it takes more effort to create data of correct answers in proportion to the number of divided processed images than to teach the presence or absence of an anomaly with respect to the recognition object image. In order to solve the problem described above, there is a known technique for learning an individual neural network involving calculating a maximum value of outputs obtained by individually processing a plurality of processed images with a neural network and teaching a presence or absence of an anomaly in a recognition object image prior to division as a correct answer with respect to an estimated value of the presence or absence of the anomaly that is obtained from the maximum value.

In a learning process of the neural network used in the technique described above, each of the plurality of processed images is processed by the neural network and all pieces of processing process data such as a pixel value of a transformed image in each processing process and a weight parameter of the neural network at that point are stored in a memory. In addition, a configuration is adopted in which, after updating the weight parameter of the neural network by backpropagation processing using an error of an estimate obtained as an output of the neural network with respect to a correct answer and processing process data that contributes toward learning, all of the pieces of processing process data are released.

However, with the configuration described above, since all of the pieces of processing process data must be stored until the backpropagation processing is performed, there is a problem that memory capacity cannot be reduced.

BRIEF DESCRIPTION OF THE DRAWINGS

FIG. 6 is a block diagram showing another (a first) configuration example of a feature amount extractor and a maximum feature amount selector in the image processing apparatus in FIG. 3.

FIG. 12 is a flow chart illustrating another operation of the image processing apparatus according to the first embodiment.

DETAILED DESCRIPTION

In general, according to one embodiment, an image processing apparatus incudes processing circuitry. The processing circuitry generates, for N processed images based on an input image, N being an integer equal to greater than 3, N feature amounts by performing feature amount extraction processing using a neural network, stores process data generated during the feature amount extraction processing in a memory, selects a maximum feature amount by performing two or more comparisons with M combinations among the N feature amounts, M being an integer equal to 2 or more and (N−1) or less, and releases (M−1) or less pieces of process data that correspond to (M−1) or less feature amounts not having been selected from the memory for each of the two or more comparisons.

Hereinafter, embodiments related to a learning apparatus and an inference apparatus which include an image processing apparatus will be described in detail with reference to drawings.

First Embodiment

In a first embodiment, training of a neural network that recognizes whether or not an object being a recognition object is included in an image will be described. For example, the object is assumed to be a crack or a stain on a manufactured article in a visual inspection or a tumor or a hemorrhaging blood vessel in a medical diagnosis.

Figure 1:
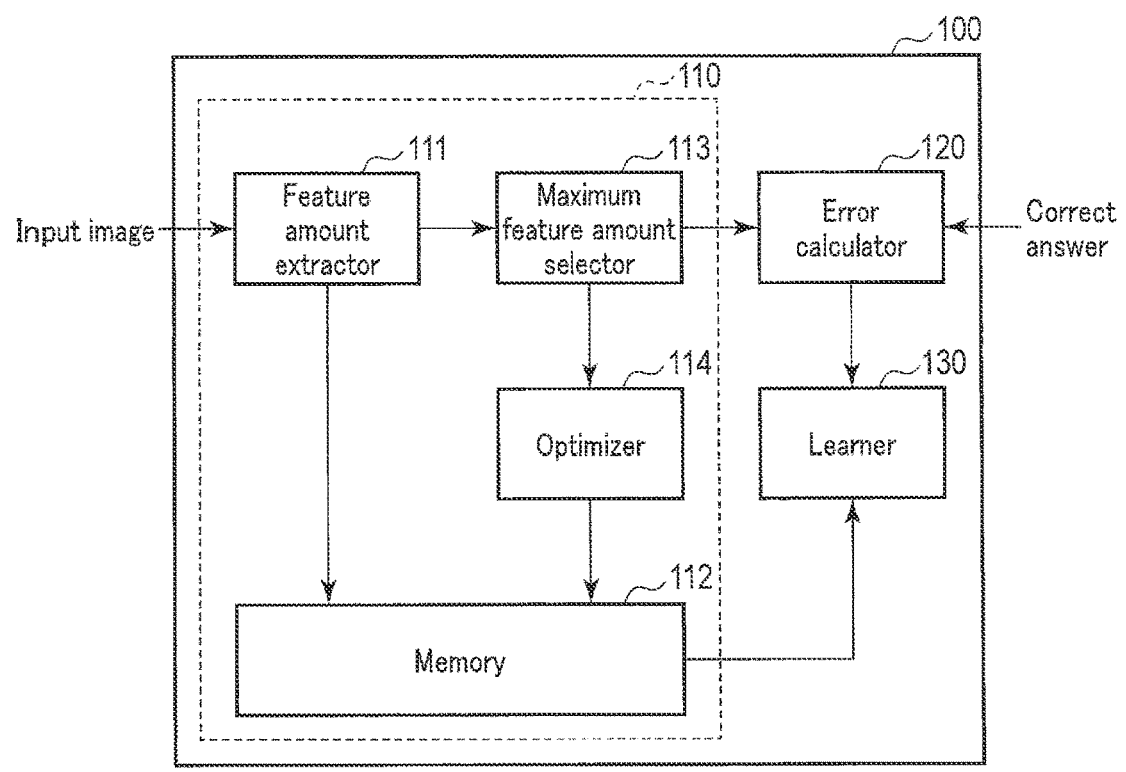
FIG. 1 is a block diagram illustrating a configuration of a learning apparatus including an image processing apparatus according to a first embodiment.

FIG. 1 is a block diagram illustrating a configuration of a learning apparatus 100 including an image processing apparatus 110 according to the first embodiment. The learning apparatus 100 comprises the image processing apparatus 110 (image processor), an error calculator 120, and a learner 130. The image processing apparatus 110 comprises a feature amount extractor 111, a memory 112, a maximum feature amount selector 113, and an optimizer 114.

Alternatively, the learning apparatus 100 may comprise an acquirer which acquires a training data set using, as a pair, an input image necessary for training of a neural network and a correct label (correct answer) corresponding to the input image. In addition, the learning apparatus 100 may comprise a controller for controlling each component.

The feature amount extractor 111 receives an input image from another device (not illustrated). The feature amount extractor 111 generates, with respect to N-number (N≥3) of processed images (N processed images) based on the input image, N-number of feature amounts (N feature amounts) by performing feature amount extraction processing using a neural network. The feature amount extractor 111 outputs processing process data that is generated during a process of the feature amount extraction processing to the memory 112 and outputs the N-number of feature amounts to the maximum feature amount selector 113.

Specifically, the feature amount extractor 111 sequentially performs feature amount extraction processing with respect to each of the N-number of processed images. In other words, after processing with respect to a first processed image is finished, the feature amount extractor 111 performs processing with respect to a subsequent second processed image and repeats this cycle until an N-th processed image. In addition, every time feature amount extraction processing is performed on a processed image, the feature amount extractor 111 outputs processing process data to the memory 112 and outputs a feature amount to the maximum feature amount selector 113.

The feature amount extraction processing described above includes convolution processing, activation processing, full-connection processing, and pooling processing. Specifically, after performing transformations such as convolution processing and activation processing with respect to a processed image, the feature amount extractor 111 generates a feature amount by a transformation into a scalar value by full-connection processing, pooling processing, and the like. In other words, the feature amount extractor 111 comprises a neural network which, when a processed image is input thereto, outputs a feature amount. In addition, the feature amount extractor 111 has N-number of neural networks (N neural networks), each of which corresponds to each of the N-number of processed images. Each of the N-number of neural networks may be referred to as an individual neural network.

In the feature amount extraction processing, final activation processing may be performed immediately before generating a feature amount. The final activation processing is processing of a transformation to a value from "0" to "1" by applying, for example, a sigmoid function. When the final activation processing is not performed in the feature amount extraction processing, final activation processing is to be performed by an arbitrary unit between selection of a maximum feature amount by the maximum feature amount selector 113 and performance of error calculation processing by the error calculator 120 to be described later. In addition, as the arbitrary unit, an activator which performs final activation processing may be provided between the maximum feature amount selector 113 and the error calculator 120.

The processing process data described above is, for example, a data value such as a pixel value of a processed image after transformation (a transformed image or an intermediate image), a value of a weight parameter set to processing during transformation, and a value of a shift parameter set to processing during transformation. Since the processing process data is used during training of a neural network to be described later, the processing process data may be rephrased as data necessary for learning.

Furthermore, the feature amount extractor 111 may generate the N-number of processed images based on the input image. For example, the feature amount extractor 111 generates the N-number of processed images by segmenting a part of the input image. A relationship between the input image and the N-number of processed images will be described with reference to FIG. 2.

Figure 2:
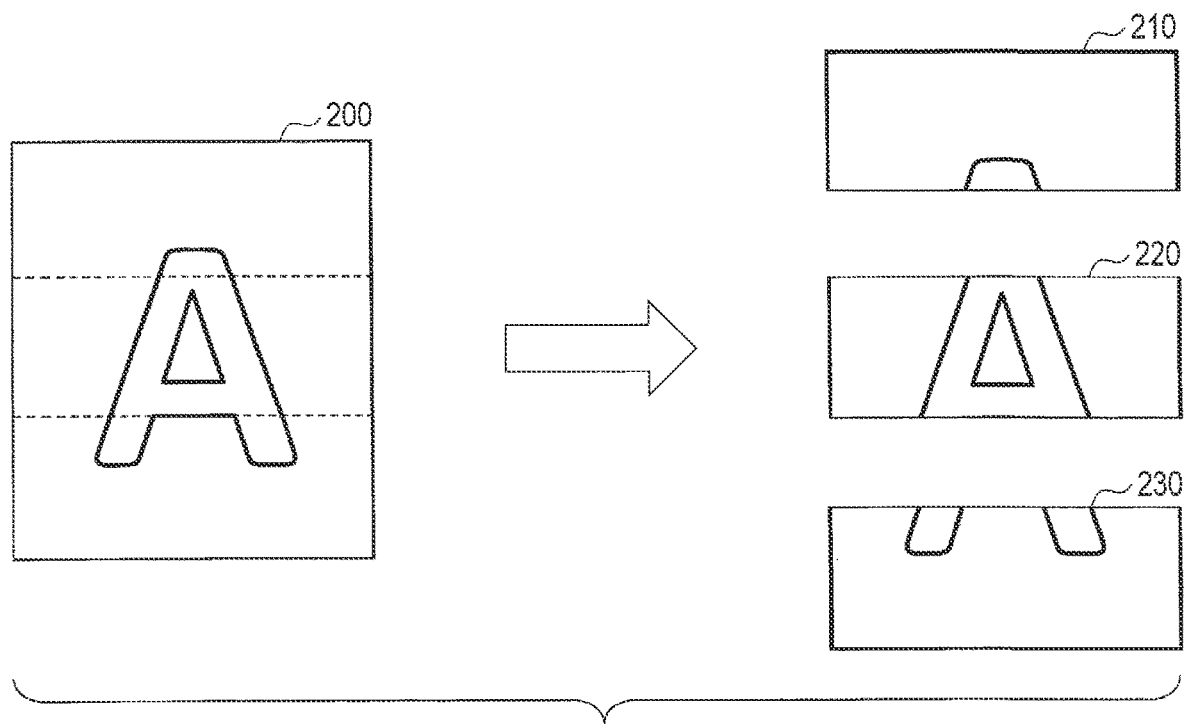
FIG. 2 is an explanatory diagram showing an example of segmenting an input image to divide the input image into three processed images.

FIG. 2 is an explanatory diagram showing an example of segmenting an input image 200 to divide the input image 200 into three processed images 210 to 230. The feature amount extractor 111 generates the three processed images 210 to 230 by segmenting the input image 200 in a predetermined size. Sizes of the three processed images 210 to 230 may be the same or may differ from each other.

Processing of segmenting the input image may be rephrased as processing of selecting a specific region from the input image. In other words, the feature amount extractor 111 generates the N-number of processed images by selecting respectively different regions among the input image.

The memory 112 receives input of processing process data from the feature amount extractor 111 and stores the processing process data. In addition, the memory 112 receives input of release instruction information from the optimizer 114. In accordance with the release instruction information, the memory 112 releases unnecessary processing process data (hereinafter, referred to as unnecessary data) among the plurality of pieces of stored processing process data. After a series of processing related to a processed image by other components is finished, the memory 112 outputs processing process data that is stored last or, in other words, processing process data related to a maximum feature amount to the learner 130.

Specifically, the memory 112 releases unnecessary data in accordance with release instruction information sequentially input from the optimizer 114 while storing processing process data that is similarly sequentially input from the feature amount extractor 111. Since the memory 112 constantly releases unnecessary data due to such an operation, there is no need to store all of the pieces of processing process data.

The unnecessary data is processing process data corresponding to a feature amount not having been selected in selection processing to be described later. Since a feature amount not having been selected is not taken into consideration during training of a neural network, the unnecessary data can be described as processing process data that does not contribute toward training of the neural network.

The maximum feature amount selector 113 receives input of N-number of feature amounts from the feature amount extractor 111. The maximum feature amount selector 113 selects a maximum feature amount by performing two or more comparisons with M-number (where M is 2 or more and (N−1) or less) of combinations (M combinations) among the N-number of feature amounts. The maximum feature amount selector 113 generates non-selection information related to a feature amount not having been selected in the selection processing and outputs the non-selection information to the optimizer 114 and outputs the maximum feature amount to the error calculator 120.

Specifically, the maximum feature amount selector 113 sequentially receives input of feature amounts from the feature amount extractor 111 and, after the input feature amounts reach the number (the M-number described above) necessary for selection processing, the maximum feature amount selector 113 performs the selection processing and selects a largest feature amount. Subsequently, the maximum feature amount selector 113 once again sequentially receives input of feature amounts from the feature amount extractor 111 and, after the input feature amounts once again reach the number necessary for selection processing, the maximum feature amount selector 113 performs the selection processing and thereafter repetitively performs the cycle.

When there is subsequent selection processing, the feature amount selected by the selection processing is once again used in the subsequent selection processing, but when there is no subsequent selection processing, the feature amount selected by the selection processing is output to the error calculator 120 as a maximum feature amount. In addition, every time selection processing is performed, the maximum feature amount selector 113 generates non-selection information and outputs the non-selection information to the optimizer 114.

When performing two or more comparisons, the maximum feature amount selector 113 may include comparisons in which the numbers of combinations differ from each other. For example, when performing a total of two comparisons, the maximum feature amount selector 113 may compare three feature amounts in the first comparison and compare two feature amounts in the subsequent second comparison.

The optimizer 114 receives input of non-selection information from the maximum feature amount selector 113. The optimizer 114 generates release instruction information based on the non-selection information and outputs the release instruction information to the memory 112. The release instruction information is information for releasing unnecessary data stored in the memory 112. In other words, for each of two or more comparisons (in other words, for each comparison for selecting a maximum feature amount) in the maximum feature amount selector 113, the optimizer 114 releases (M−1) number or less pieces of processing process data that correspond to (M−1) number or less feature amounts not having been selected.

The error calculator 120 receives an input of a maximum feature amount from the maximum feature amount selector 113 and receives input of a correct answer (a correct feature amount) corresponding to the input image from another device. The error calculator 120 calculates an error value based on the maximum feature amount and the correct feature amount. The error calculator 120 outputs the error value to the learner 130.

Specifically, the error calculator 120 compares the maximum feature amount and the correct feature amount with each other and calculates an error value represented by binary cross-entropy or the like. For example, the correct feature amount is a value that takes "1" when an object being a recognition object is included in the input image but takes "0" when not included.

The learner 130 receives input of processing process data related to the maximum feature amount from the memory 112 and receives input of an error value from the error calculator 120. The learner 130 trains a neural network comprising the feature amount extractor 111 based on processing process data related to the maximum feature amount and an error value.

Specifically, using processing process data related to the maximum feature amount and an error value, the learner 130 trains an individual neural network having extracted the maximum feature amount by error back propagation. Learning by error back propagation is performed by tracing, in a reverse direction, a link of data in forward processing from inputting an input image to obtaining a maximum feature amount in order to sequentially update a value of a weight parameter and a value of a shift parameter having been set to various kinds of processing in the individual neural network. Accordingly, with an individual neural network corresponding to a feature amount not having been selected, since the link of data has been broken along the way, the individual neural network is not considered a learning object. In other words, processing process data related to a feature amount not having been selected does not contribute to training of the individual neural network having extracted the maximum feature amount.

This concludes the description of the configuration of the learning apparatus 100 including the image processing apparatus 110 according to the first embodiment. Next, a detailed configuration of the image processing apparatus 110 will be described with reference to FIG. 3. In the image processing apparatus 110 shown in FIG. 3, the use of three processed images such as those shown in FIG. 2 is assumed.

Figure 3:
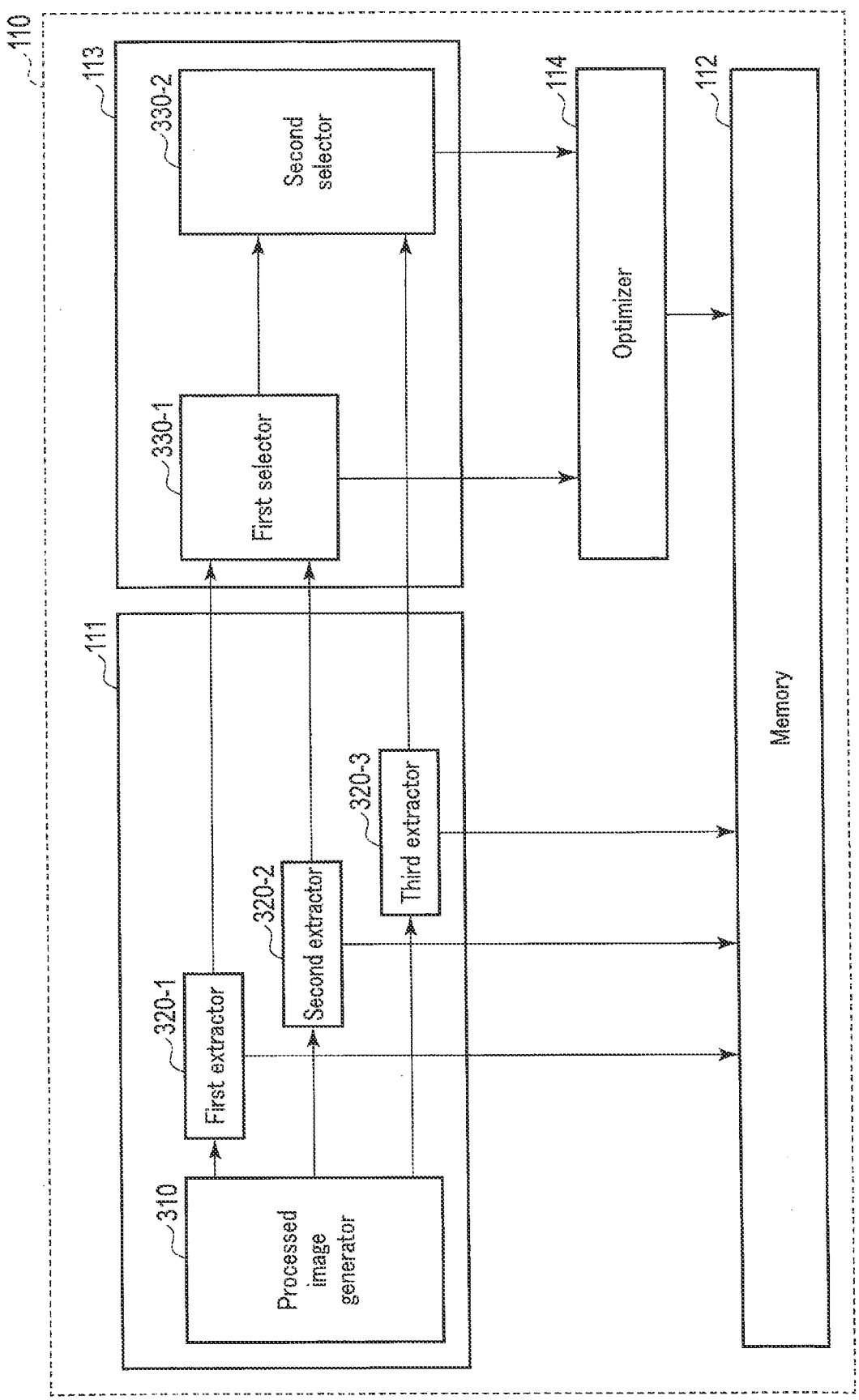
FIG. 3 is a block diagram illustrating a detailed configuration of the image processing apparatus shown in FIG. 1.

FIG. 3 is a block diagram illustrating a detailed configuration of the image processing apparatus 110. The feature amount extractor 111 shown in FIG. 3 comprises a processed image generator 310, a first extractor 320-1, a second extractor 320-2, and a third extractor 320-3. The maximum feature amount selector 113 shown in FIG. 3 comprises a first selector 330-1 and a second selector 330-2.

The processed image generator 310 generates three processed images based on an input image. Among the three processed images, the processed image generator 310 outputs a first processed image to the first extractor 320-1, a second processed image to the second extractor 320-2, and a third processed image to the third extractor 320-3.

The first extractor 320-1 receives input of the first processed image from the processed image generator 310. The first extractor 320-1 generates a first feature amount by performing first extraction processing that corresponds to feature amount extraction processing with respect to the first processed image. The first extractor 320-1 outputs the first feature amount to the first selector 330-1 and outputs first processing process data that is generated during the process of the first extraction processing to the memory 112.

After the first feature amount is extracted, the memory 112 receives input of the first processing process data from the first extractor 320-1 and stores the first processing process data. At this point, the memory 112 stores a piece of processing process data.

The second extractor 320-2 receives input of the second processed image from the processed image generator 310. The second extractor 320-2 generates a second feature amount by performing second extraction processing that corresponds to feature amount extraction processing with respect to the second processed image. The second extractor 320-2 outputs the second feature amount to the first selector 330-1 and outputs second processing process data that is generated during the process of the second extraction processing to the memory 112.

After the second feature amount is extracted, the memory 112 receives input of the second processing process data from the second extractor 320-2 and stores the second processing process data. At this point, the memory 112 stores two pieces of processing process data.

The first selector 330-1 receives input of the first feature amount from the first extractor 320-1 and receives input of the second feature amount from the second extractor 320-2. The first selector 330-1 compares the first feature amount and the second feature amount with each other and selects whichever is larger as a first selected feature amount. The first selector 330-1 generates first non-selection information related to a feature amount not having been selected and outputs the first non-selection information to the optimizer 114 and outputs the first selected feature amount to the second selector 330-2.

After the first non-selection information is generated, the optimizer 114 receives input of the first non-selection information from the first selector 330-1. The optimizer 114 generates first release instruction information based on the first non-selection information and outputs the first release instruction information to the memory 112.

After the first release instruction information is generated, the memory 112 receives input of the first release instruction information. In accordance with the first release instruction information, the memory 112 releases unnecessary data among the two pieces of stored processing process data. At this point, the memory 112 stores a piece of processing process data.

The third extractor 320-3 receives input of the third processed image from the processed image generator 310. The third extractor 320-3 generates a third feature amount by performing third extraction processing that corresponds to feature amount extraction processing with respect to the third processed image. The third extractor 320-3 outputs the third feature amount to the second selector 330-2 and outputs third processing process data that is generated during the process of the third extraction processing to the memory 112.

The feature amount extraction processing in the third extractor 320-3 is performed at a timing where only one piece of processing process data is stored in the memory 112 when outputting the third processing process data to the memory 112. Alternatively, the feature amount extraction processing in the third extractor 320-3 is performed in a state where a piece of processing process data is stored in the memory 112.

After the third feature amount is extracted, the memory 112 receives input of the third processing process data from the third extractor 320-3 and stores the third processing process data. At this point, the memory 112 stores two pieces of processing process data.

The second selector 330-2 receives input of the first selected feature amount from the first extractor 320-1 and receives input of the third feature amount from the third extractor 320-3. The second selector 330-2 compares the first selected feature amount and the third feature amount with each other and selects whichever is larger as a second selected feature amount. The second selector 330-2 generates second non-selection information related to a feature amount not having been selected and outputs the second non-selection information to the optimizer 114 and outputs the second selected feature amount as a maximum feature amount to the error calculator 120.

After the second non-selection information is generated, the optimizer 114 receives input of the second non-selection information from the second selector 330-2. The optimizer 114 generates second release instruction information based on the second non-selection information and outputs the second release instruction information to the memory 112.

After the second release instruction information is generated, the memory 112 receives input of the second release instruction information. In accordance with the second release instruction information, the memory 112 releases unnecessary data among the two pieces of stored processing process data. At this point, the memory 112 stores only processing process data related to a maximum feature amount. In addition, the memory 112 outputs the processing process data related to the maximum feature amount to the learner 130.

To summarize the configuration shown in FIG. 3, the memory 112 stores only two pieces of processing process data respectively corresponding to two feature amounts being objects of selection processing in the first selector 330-1 or the second selector 330-2. In other words, the memory 112 stores up to an upper limit of two pieces of processing process data. While the feature amount extractor 111 generates a total of three pieces of processing process data, since the memory 112 releases unnecessary data for each selection processing, the three pieces of processing process data need not all be stored and memory capacity can be reduced.

This concludes the description of an example of processing using three processed images generated from an input image. Hereinafter, an example of generating four processed images from an input image will be described with reference to FIG. 4.

Figure 4:
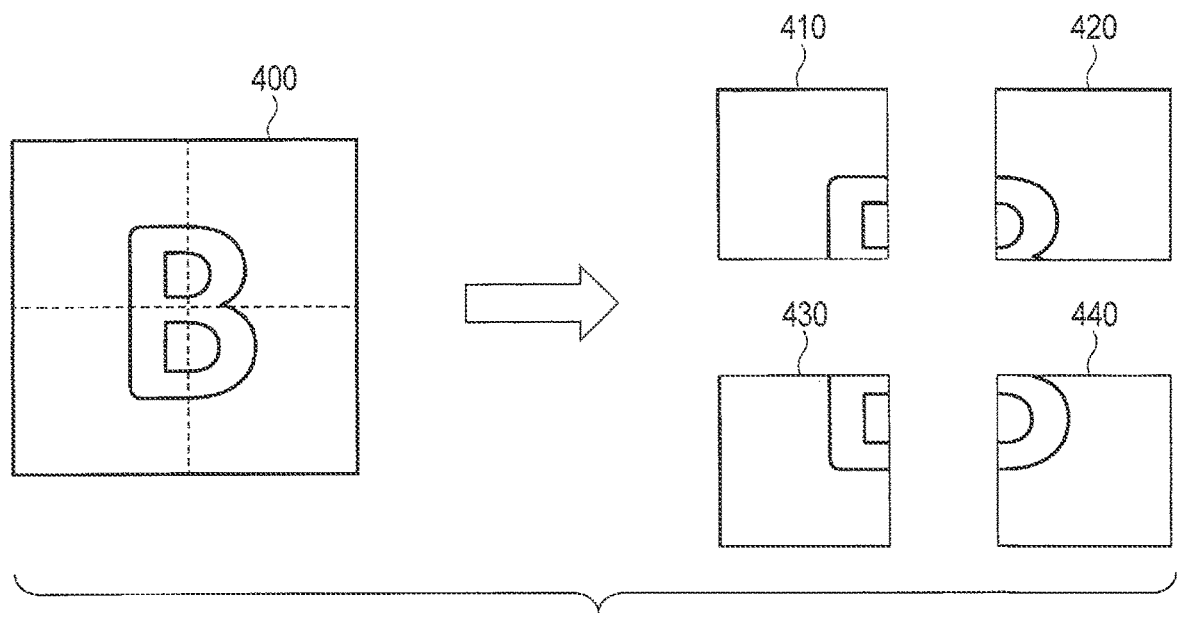
FIG. 4 is an explanatory diagram showing an example of segmenting an input image to divide the input image into four processed images.

FIG. 4 is an explanatory diagram showing an example of segmenting an input image 400 to divide the input image 400 into four processed images 410 to 440. The feature amount extractor 111 generates the four processed images 410 to 440 by segmenting the input image 400 in a predetermined size.

In FIG. 4, the four processed images 410 to 440 are generated by simply dividing the input image 400. However, when an object that is a recognition object is present near a boundary with an adjacent processed image, there is a possibility that the object that is a recognition object may become fragmented by the boundary. In consideration thereof, segmenting a plurality of processed images in an overlapping manner will be described with reference to FIG. 5.

Figure 5:
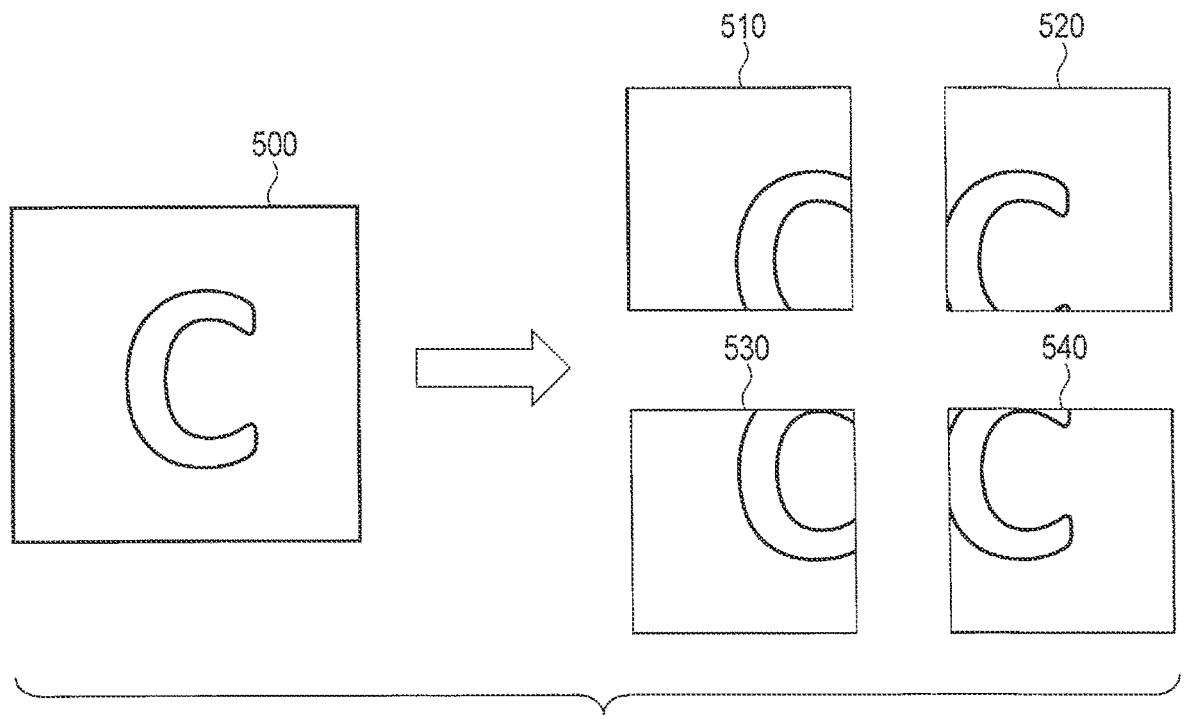
FIG. 5 is an explanatory diagram showing an example of segmenting an input image in an overlapping manner to divide the input image into four processed images.

FIG. 5 is an explanatory diagram showing an example of segmenting an input image 500 in an overlapping manner to divide the input image 500 into four processed images 510 to 540. The feature amount extractor 111 generates the four processed images 510 to 540 by segmenting the input image 500 so that a plurality of processing images overlap with each other.

FIG. 5 shows the processed image 510 including an upper left vertex of the input image 500, the processed image 520 including an upper right vertex, the processed image 530 including a lower left vertex, and the processed image 540 including a lower right vertex. Each of the four processed images 510 to 540 has a partial overlapping region. By having a plurality of processed images overlap with each other, even when the object that is the recognition object becomes fragmented in one of the processed images, the object that is the recognition object can be prevented from becoming fragmented in the other processed images. Accordingly, the image processing apparatus 110 can prevent non-detection of the recognition object.

This concludes the description of an example of generating four processed images from an input image. However, the number of divided processed images is not limited to three or four. Hereinafter, a configuration example of an image processing apparatus in a case where the number of divided processed images is expanded to N will be described with reference to FIG. 6.

FIG. 6 is a block diagram showing another (a first) configuration example of the feature amount extractor 111 and the maximum feature amount selector 113 in the image processing apparatus 110 shown in FIG. 3. The first configuration example represents an expansion of the processing using three processed images shown in FIG. 3 to processing using N-number of processed images. Therefore, in FIG. 6, the feature amount extractor 111 will be described as a feature amount extractor 111A and the maximum feature amount selector 113 will be described as a maximum feature amount selector 113A. In FIG. 6, illustration of the memory 112 and the optimizer 114 in the image processing apparatus 110 has been omitted.

The feature amount extractor 111A comprises a processed image generator 610 and a first extractor 620-1 to an N-th extractor 620-N. The maximum feature amount selector 113A comprises a first selector 630-1 to an L-th selector 630-L. In this case, L equals (N−1).

The processed image generator 610 generates N-number of processed images based on an input image. The processed image generator 610 outputs each of the N-number of processed images to the first extractor 620-1 to the N-th extractor 620-N.

Since the first extractor 620-1, the second extractor 620-2, the first selector 630-1, the third extractor 620-3, and the second selector 630-2 perform processing similar to that of the first extractor 320-1, the second extractor 320-2, the first selector 330-1, the third extractor 320-3, and the second selector 330-2 shown in FIG. 3, descriptions will be omitted.

Processing of the fourth extractor 620-4 and the third selector 630-3 is approximately similar to that of the third extractor 620-3 and the second selector 630-2. A similar description applies to subsequent extractors and selectors.

To summarize the configuration shown in FIG. 6, the second selector 630-2 and subsequent selectors are configured to sequentially compare two feature amounts, namely, a selected feature amount selected by an immediately-preceding selector and an unselected feature amount, with each other. In addition, the feature amount extraction processing in the third extractor 620-3 and subsequent extractors is performed at a timing where only one piece of processing process data is stored in the memory 112 when outputting the processing process data to the memory 112. Alternatively, the feature amount extraction processing in the third extractor 620-3 and subsequent extractors is performed in a state where a piece of processing process data is stored in the memory 112. In other words, even when processed images are expanded to N-number of processed images, the memory 112 need only store up to an upper limit of two pieces of processing process data.

This concludes the description of the configuration example of an image processing apparatus in a case where the number of divided processed images is expanded to N. Next, an operation of the image processing apparatus 110 according to the first embodiment using N-number of processed images will be described with reference to FIG. 7.

Figure 7:
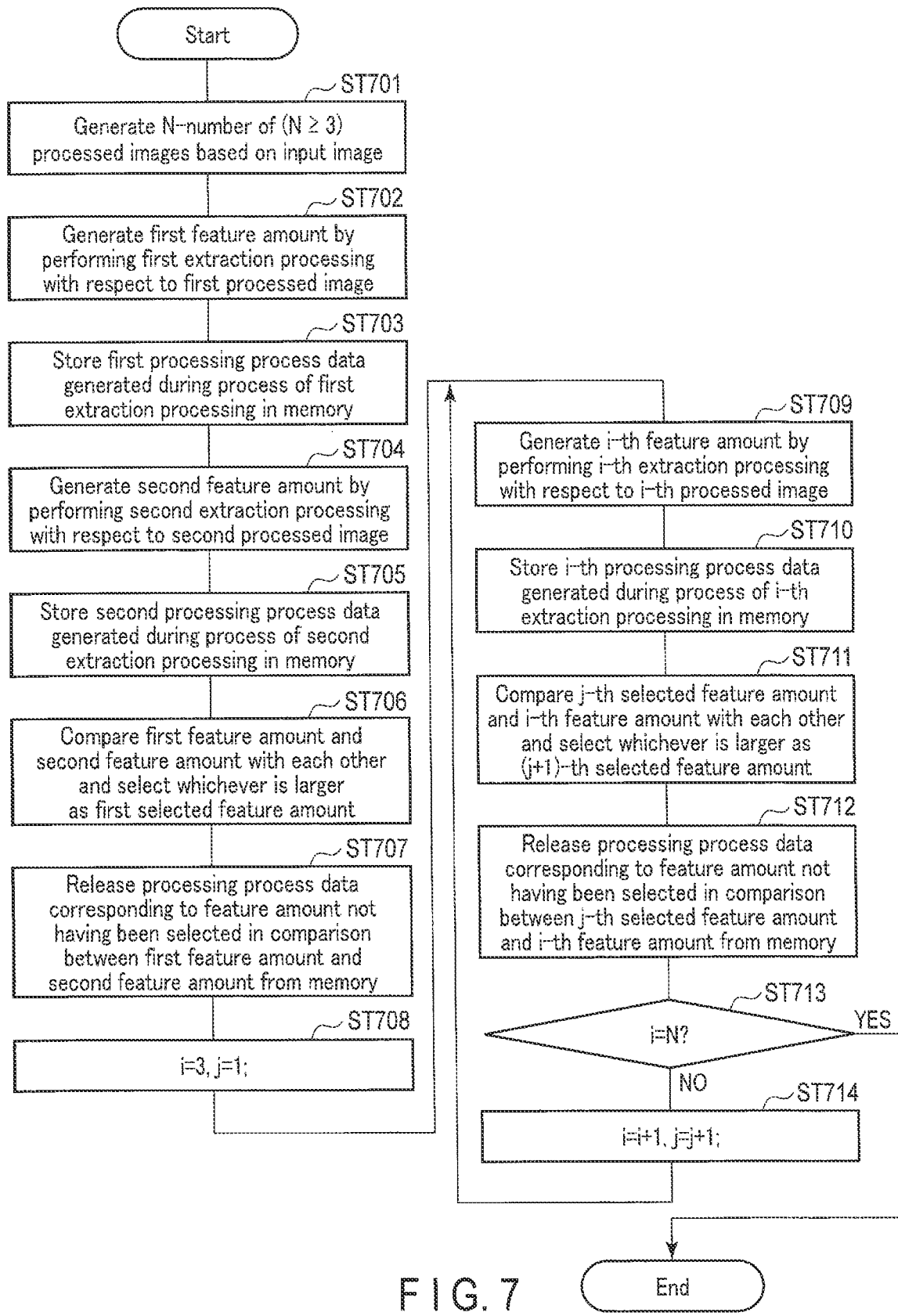
FIG. 7 is a flow chart illustrating an operation of the image processing apparatus according to the first embodiment.

FIG. 7 is a flow chart illustrating an operation of the image processing apparatus according to the first embodiment. The flow chart in FIG. 7 shows a flow of a series of maximum feature amount selection processing with respect to an input image. In addition, the flow chart in FIG. 7 is premised on a configuration in which two feature amounts are compared with each other in a selector as shown in FIG. 6. The respective components in FIGS. 1 and 6 will be referred to in the following description.

(Step ST701)

When the image processing apparatus 110 acquires an input image, the processed image generator 610 generates N-number of (N≥3) processed images based on the input image.

(Step ST702)

The first extractor 620-1 generates a first feature amount by performing first extraction processing with respect to a first processed image.

(Step ST703)

The memory 112 stores first processing process data that is generated during the process of the first extraction processing.

(Step ST704)

The second extractor 620-2 generates a second feature amount by performing second extraction processing with respect to a second processed image.

(Step ST705)

The memory 112 stores second processing process data that is generated during the process of the second extraction processing. At this point, the memory 112 stores two pieces of processing process data.

(Step ST706)

The first selector 630-1 compares the first feature amount and the second feature amount with each other and selects whichever is larger as a first selected feature amount.

(Step ST707)

The optimizer 114 releases processing process data corresponding to a feature amount not having been selected in the comparison between the first feature amount and the second feature amount from the memory 112. Accordingly, the memory 112 stores a piece of processing process data.
(Step ST708)

The image processing apparatus 110 defines a variable i and a variable j and respectively assigns 3 and 1 to the variables.
(Step ST709)

An i-th extractor 620-$i$ generates an i-th feature amount by performing i-th extraction processing with respect to an i-th processed image.
(Step ST710)

The memory 112 stores i-th processing process data that is generated during the process of the i-th extraction processing. At this point, the memory 112 stores two pieces of processing process data.
(Step ST711)

An (i−1)-th selector 630-(i−1) compares a j-th selected feature amount and the i-th feature amount with each other and selects whichever is larger as a (j+1)-th selected feature amount.
(Step ST712)

The optimizer 114 releases processing process data corresponding to a feature amount not having been selected in the comparison between the j-th selected feature amount and the i-th feature amount from the memory 112. Accordingly, the memory 112 stores only a piece of processing process data.
(Step ST713)

The image processing apparatus 110 determines whether or not the variable i is N. When the variable i is not N, processing is advanced to step ST714. On the other hand, when the variable i is N, the image processing apparatus 110 outputs a selected feature amount selected in immediately-preceding selection processing as a maximum feature amount to the error calculator 120, outputs processing process data related to the maximum feature amount to the learner 130, and ends the processing.
(Step ST714)

The image processing apparatus 110 respectively adds 1 to the variable i and the variable j. After the processing of step ST714, the processing returns to step ST709.

This concludes the description of an operation of the image processing apparatus 110 according to the first embodiment using N-number of processed images. Configurations in which two feature amounts are compared in a selector have been described above. However, the number of feature amounts to be compared is not limited to two. Hereinafter, an example in which three feature amounts are compared in a selector will be described with reference to FIG. 8. When describing FIG. 8, FIG. 6 which is a configuration in which two feature amounts are compared in a selector will be referred to as a comparison object.

Figure 8:
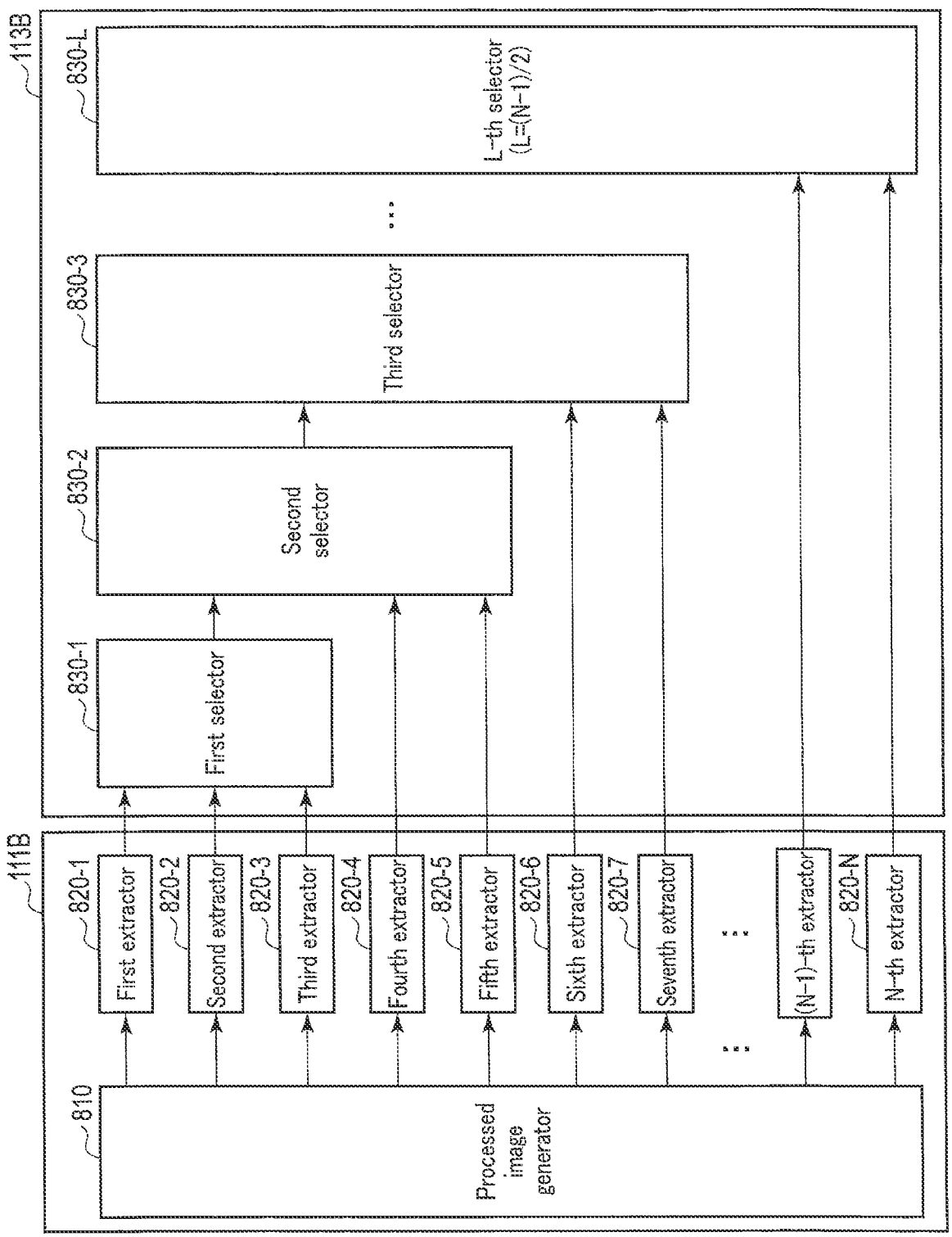
FIG. 8 is a block diagram showing another (a second) configuration example of the feature amount extractor and the maximum feature amount selector in the image processing apparatus in FIG. 3.

FIG. 8 is a block diagram showing another (a second) configuration example of the feature amount extractor and the maximum feature amount selector in the image processing apparatus in FIG. 3. The second configuration example represents an expansion of the comparison between two feature amounts in the selector shown in FIG. 3 or FIG. 6 to a comparison between three feature amounts. Therefore, in FIG. 8, the feature amount extractor 111 will be described as a feature amount extractor 111B and the maximum feature amount selector 113 will be described as a maximum feature amount selector 113B. In FIG. 8, illustration of the memory 112 and the optimizer 114 in the image processing apparatus 110 has been omitted.

The feature amount extractor 111B comprises a processed image generator 810 and a first extractor 820-1 to an N-th extractor 820-N. The maximum feature amount selector 113B comprises a first selector 830-1 to an L-th selector 830-L. In this case, L equals (N−1)/2.

As described earlier, a difference between FIG. 8 and FIG. 6 is the number of feature amounts to be compared in the selectors. Specifically, the first selector 830-1 shown in FIG. 8 receives input of a first feature amount from the first extractor 820-1, receives input of a second feature amount from the second extractor 820-2, and receives input of a third feature amount from the third extractor 820-3. In addition, the first selector 830-1 compares three feature amounts from the first feature amount to the third feature amount and selects whichever is largest as a first selected feature amount.

Furthermore, in FIG. 8, the number of pieces of processing process data stored by the memory 112 also differs. For example, since three feature amounts are compared in the first selector 830-1, the memory 112 stores three pieces of processing process data at a point where the third feature amount is extracted.

When the first selected feature amount is selected in the first selector 830-1, the memory 112 releases unnecessary data among the three pieces of stored processing process data (in this case, two pieces of processing process data corresponding to the two feature amounts not having been selected). At this point, the memory 112 stores a piece of processing process data.

Next, as a fourth extractor 820-4 extracts a fourth feature amount and a fifth extractor 820-5 extracts a fifth feature amount, the memory 112 once again enters a state of storing three pieces of processing process data.

Furthermore, the second selector 830-2 receives input of a first selected feature amount from the first selector 830-1, receives input of the fourth feature amount from the fourth extractor 820-4, and receives input of the fifth feature amount from the fifth extractor 820-5. In addition, the second selector 830-2 compares three feature amounts including the first selected feature amount, the fourth feature amount, and the fifth feature amount and selects whichever is largest as a second selected feature amount.

When the second selected feature amount is selected, the memory 112 releases unnecessary data among the three pieces of stored processing process data. At this point, the memory 112 once again stores only a piece of processing process data.

To summarize the configuration shown in FIG. 8, the second selector 830-2 and subsequent selectors are configured to sequentially compare three feature amounts, namely, a selected feature amount selected by an immediately-preceding selector and two unselected feature amounts, with each other. In addition, the feature amount extraction processing in the fourth extractor 820-4 and subsequent extractors is performed in a state where the memory 112 stores two pieces of processing process data at the most when the processing process data is output to the memory 112. In other words, the memory 112 stores up to an upper limit of three pieces of processing process data.

While an example of a configuration of the image processing apparatus 110 in which three feature amounts are compared in a selector has been shown in FIG. 8, the image processing apparatus 110 is not limited to this configuration. For example, the image processing apparatus 110 may be configured such that four or more feature amounts are compared in a selector.

As described above, by matching an upper limit of pieces of processing process data to be stored in the memory 112 with the number of feature amounts to be compared in the selector, the memory 112 need only store, as an upper limit, the same number of pieces of processing process data as the number of feature amounts to be compared in the selector regardless of the number of processed images.

Furthermore, in the configuration shown in FIG. 8, respective extraction processing of the first extractor 820-1, the second extractor 820-2, and the third extractor 820-3 may be performed in parallel. Subsequently, after selection processing by the first selector 830-1 is completed and unnecessary data is deleted from the memory 112, respective extraction processing of the fourth extractor 820-4 and the fifth extractor 820-5 may also be performed in parallel, and so on. Therefore, according to the configuration shown in FIG. 8, since extraction processing can be performed in parallel, the image processing apparatus 110 can reduce overall processing time as compared to the configuration shown in FIG. 6.

Parallelization of extraction processing in FIG. 8 can be similarly performed even when the number of feature amounts to be compared in the selector increases. For example, when M-number of feature amounts (M feature amounts) are to be compared in the selector, the image processing apparatus 110 may perform extraction processing related to M-number of feature amounts to be used in first selection processing in parallel and perform extraction processing related to (M−1)-number of feature amounts to be used in second and subsequent selection processing in parallel. In other words, when there are a plurality of feature amounts immediately after extraction processing to be input to the selector, the image processing apparatus 110 may simultaneously generate the plurality of feature amounts.

(Other Embodiments of Processed Image)

An example of generating a plurality of processed images by dividing an input image has been described above. However, a plurality of processed images are not limited to being divisions of an input image. Hereinafter, an example of generating a plurality of processed images by reducing an input image will be described with reference to FIG. 9.

Figure 9:
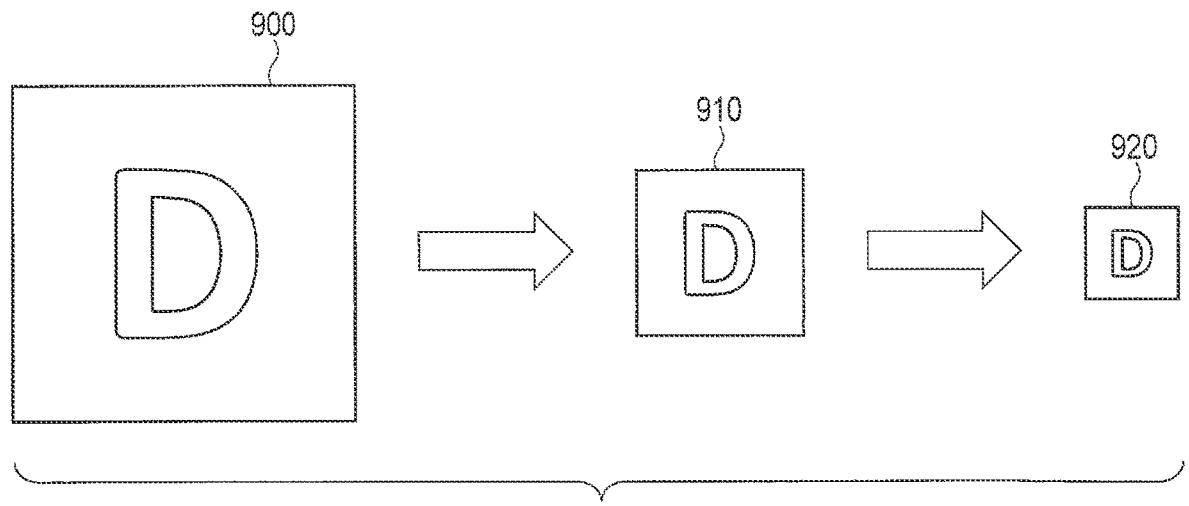
FIG. 9 is an explanatory diagram showing an example of reducing an input image to generate two processed images.

FIG. 9 is an explanatory diagram showing an example of reducing an input image 900 to generate two processed images 910 and 920. The feature amount extractor 111 generates two processed images 910 and 920 with different reduction ratios by reducing the input image 900 by reduction processing. For example, the feature amount extractor 111 generates the processed image 910 by reducing the input image 900 to ½ and generates the processed image 920 by reducing the input image 900 to ¼. When the input image 900 satisfies an image size that can be processed by the image processing apparatus 110, the input image 900 can be used as a processed image.

The reduction processing described above can be performed separately from processing of a neural network using a fixed filter such as a bilinear filter or a bicubic filter or may be performed as a part of a neural network using the fixed filter as a convolution filter. In the latter case, although a learning rate of a neural network as a whole declines due to the need to newly train a parameter of the convolution filter, an improvement in recognition accuracy is expected as compared to the former case.

Next, an advantage of using processed images with different reduction ratios as shown in FIG. 9 will be described. Two perspectives will be described below.

A first perspective is an advantage of learning a reduced image itself. For example, when an object that is a recognition object with size different from the time of learning is included in an input image during inference using the image processing apparatus 110, there is a likelihood that a neural network learned using a plurality of processed images that do not use a reduced image may not be able to recognize the object.

On the other hand, when using processed images with different reduction ratios such as those shown in FIG. 9, for example, the object is to be learned in a size A with the input image 900 as a processed image, the object is to be learned in a size A/2 with the processed image 910, and the object is to be learned in a size A/4 with the processed image 920. In this case, if a parameter of an individual neural network is shared, the image processing apparatus 110 can make the object in any of the sizes described above recognizable.

Furthermore, even when an object in a size 2A appears in the input image 900 as a processed image, since the object is reduced to the size A in the processed image 910, the image processing apparatus 110 can even make the object in the size 2A recognizable. This also applies to a case where an object in a size 4A appears in the input image 900 as a processed image.

Therefore, by having the parameter of an individual neural network be shared between learning and inference using processed images with different reduction ratios, the image processing apparatus 110 can make an object that is a recognition object with size different from that at the time of learning be recognizable at the time of inference.

The second perspective is an advantage of including convolution processing in an individual neural network. To this end, first, a concept of a receptive field in convolution processing in a neural network will be described with reference to FIG. 10.

Figure 10:
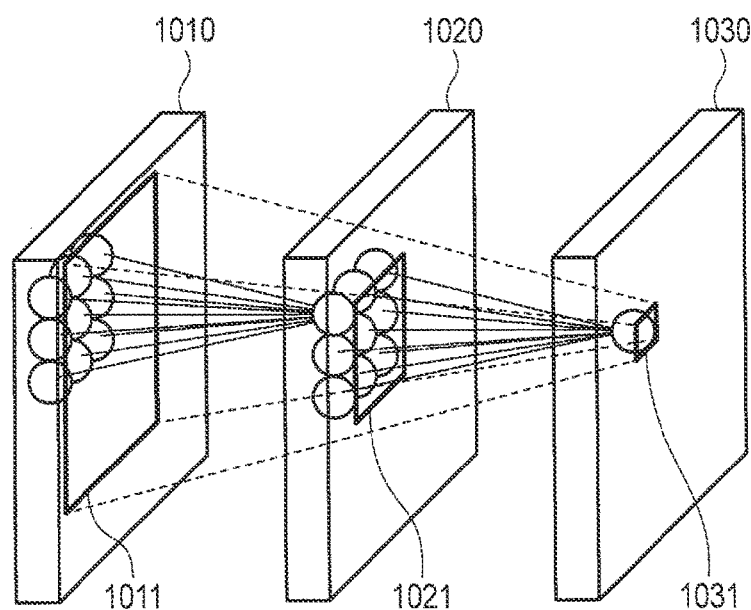
FIG. 10 is an explanatory diagram illustrating a transformed image, an intermediate image, and a receptive field in two convolution processings with respect to an input image.

FIG. 10 is an explanatory diagram illustrating a transformed image 1020, an intermediate image 1030, and a receptive field in two convolutions with respect to an input image 1010. FIG. 10 shows an example of performing convolution processing of 3×3 pixels with respect to the input image 1010 to generate the transformed image 1020 and similarly performing convolution processing of 3×3 pixels with respect to the transformed image 1020 to generate the intermediate image 1030. Note that illustration of activation processing and the like has been omitted. In this case, a receptive field refers to a pixel range 1021 of the transformed image 1020 and a pixel range 1011 of the input image 1010 which affect a pixel (for example, a pixel 1031) of the intermediate image 1030. FIG. 10 shows an example where the pixel range 1021 is 3×3 pixels and the pixel range 1011 is 5×5 pixels. Since the pixel 1031 is only dependent on the pixel range 1021 and the pixel range 1011 which comprise the receptive field, any changes to pixel values outside of the receptive field do not affect the pixel 1031.

When a size of the intermediate image 1030 and a kernel (for example, 3×3 pixels) of convolution processing are unchanged, the larger the number of convolutions for generating a transformed image or, in other words, the larger the number of convolutional layers, the wider a pixel range of the receptive field (the pixel range 1011) of the input image 1010.

In consideration of the above, convolution processing with respect to each of processed images with different reduction ratios as shown in FIG. 9 will be considered. First, each of three individual neural networks comprises a plurality of convolutional layers. In addition, a transformed image last subjected to convolution processing in the plurality of convolutional layers will be referred to as an intermediate image. The image processing apparatus 110 generates a feature amount by applying full-connection processing or global pooling processing with respect to an intermediate image.

In a neural network configured as described above, generally, extraction of a feature amount of an input image is performed in processing up to the intermediate image and identification using the feature amount is performed in subsequent processing (the full-connection processing and the global pooling processing described above). Therefore, desirably, a feature of an object that is a recognition object is sufficiently reflected on each pixel of the intermediate image. However, for example, when an object that is larger than at the time of learning is included in the input image, the object becomes larger than the receptive field of the input image and a feature of an object that is a recognition object may not be sufficiently reflected in the intermediate image. In consideration thereof, while a region of the receptive field of the input image may conceivably be widened by increasing convolutional layers, this creates a problem in that an amount of processing increases in proportion to the increase in convolutional layers.

On the other hand, due to learning neural networks using reduced images, when structures of a plurality of individual neural networks are the same, a size of a receptive field with respect to an input image in each of the individual neural networks is the same. Therefore, even if an object that is larger than at the time of learning is included in the input image, the image processing apparatus 110 can cause any of the individual neural networks to recognize the object that is a recognition object.

In addition, as described earlier, when an individual neural network is to also train a parameter of a convolution filter used to reduce an image, a reduced image in a mode which differs from that of the input image may be produced. Therefore, desirably, the image processing apparatus 110 differentiates parameters of individual neural networks and optimizes the parameters of the individual neural networks for each reduction ratio of an image.

To summarize the above, by using a plurality of processed images obtained by reducing an input image, the image processing apparatus 110 can recognize an object even when a size of the object differs from a size of an object being a recognition object that is assumed at the time of learning.

In addition, when a size of a processed image is reduced, a capacity of processing process data can also be reduced. Therefore, by performing feature amount extraction processing from a processed image with a highest reduction ratio, the image processing apparatus 110 can reduce a capacity of data to be stored in the memory 112.

(Another Configuration Example of Maximum Feature Amount Selector)

Figure 11:
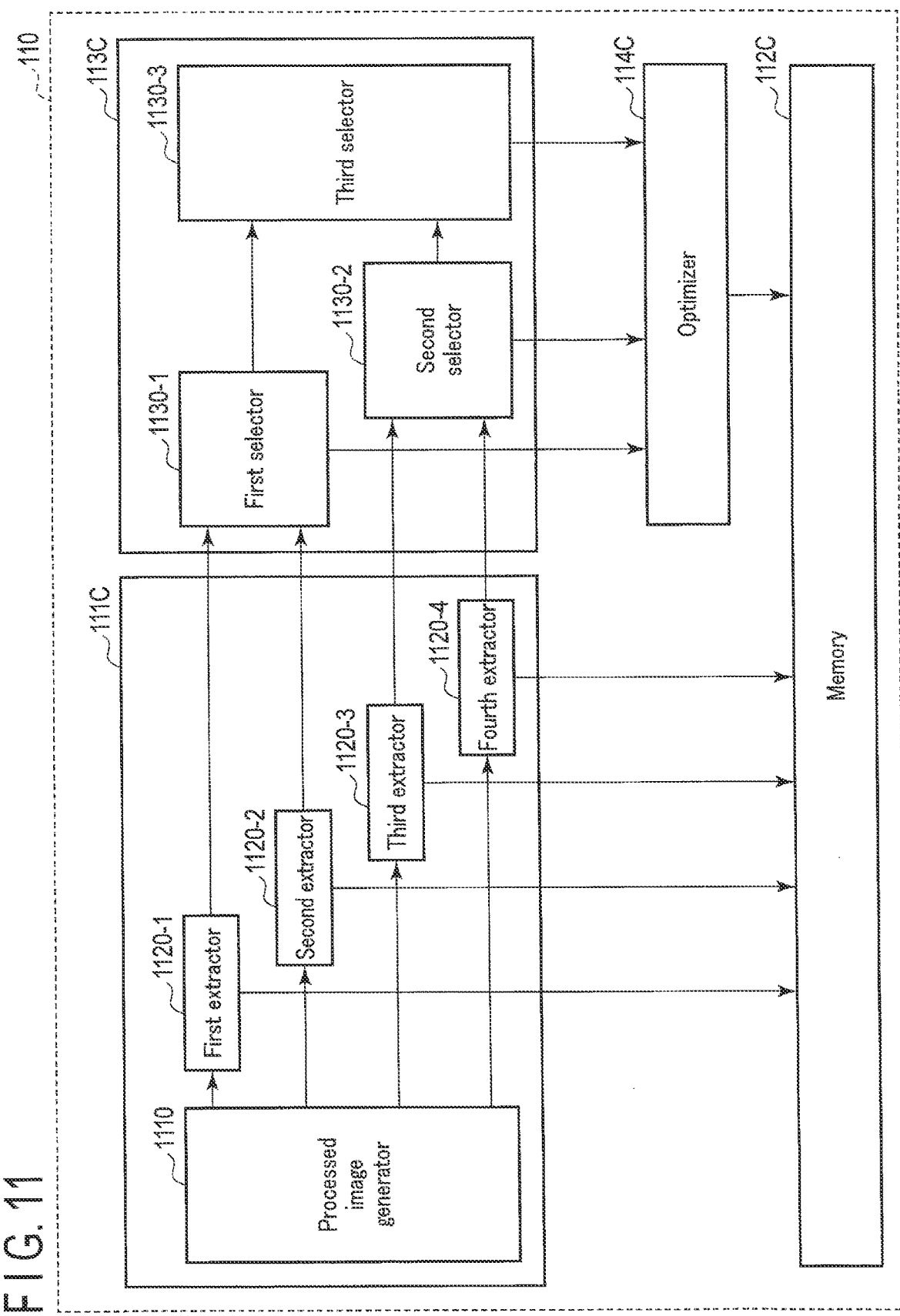
FIG. 11 is a block diagram showing another configuration example of the image processing apparatus shown in FIG. 1.

A configuration of comparing outputs from different selectors among the respective selectors of a maximum feature amount selector has not been illustrated so far. Hereinafter, a configuration of a maximum feature amount selector including selectors that compare outputs from different selectors will be described with reference to FIG. 11. In FIG. 11, for the sake of brevity, the use of four processed images is assumed.

FIG. 11 is a block diagram showing another configuration example of the image processing apparatus 110 shown in FIG. 1. The other configuration example includes a configuration of comparing outputs from different selectors. Therefore, in FIG. 11, the feature amount extractor 111, the memory 112, the maximum feature amount selector 113, and the optimizer 114 will be respectively described as a feature amount extractor 111C, a memory 112C, a maximum feature amount selector 113C, and an optimizer 114C.

The feature amount extractor 111C comprises a processed image generator 1110 and a first extractor 1120-1 to a fourth extractor 1120-4. The maximum feature amount selector 113C comprises a first selector 1130-1 to a third selector 1130-3.

The processed image generator 1110 generates four processed images based on an input image. Among the four processed images, the processed image generator 1110 outputs a first processed image to the first extractor 1120-1, a second processed image to the second extractor 1120-2, a third processed image to the third extractor 1120-3, and a fourth processed image to the fourth extractor 1120-4.

The first extractor 1120-1 receives input of the first processed image from the processed image generator 1110. The first extractor 1120-1 generates a first feature amount by performing first extraction processing that corresponds to feature amount extraction processing with respect to the first processed image. The first extractor 1120-1 outputs the first feature amount to the first selector 1130-1 and outputs first processing process data that is generated during the process of the first extraction processing to the memory 112C.

After the first feature amount is extracted, the memory 112C receives input of the first processing process data from the first extractor 1120-1 and stores the first processing process data. At this point, the memory 112C stores a piece of processing process data.

The second extractor 1120-2 receives input of the second processed image from the processed image generator 1110. The second extractor 1120-2 generates a second feature amount by performing second extraction processing that corresponds to feature amount extraction processing with respect to the second processed image. The second extractor 1120-2 outputs the second feature amount to the first selector 1130-1 and outputs second processing process data that is generated during the process of the second extraction processing to the memory 112C.

The second extraction processing in the second extractor 1120-2 may be performed at a same timing as the first extraction processing in the first extractor 1120-1.

After the second feature amount is extracted, the memory 112C receives input of the second processing process data from the second extractor 1120-2 and stores the second processing process data. At this point, the memory 112C stores two pieces of processing process data.

The first selector 1130-1 receives input of the first feature amount from the first extractor 1120-1 and receives input of the second feature amount from the second extractor 1120-2. The first selector 1130-1 compares the first feature amount and the second feature amount with each other and selects whichever is larger as a first selected feature amount. The first selector 1130-1 generates first non-selection information related to a feature amount not having been selected and outputs the first non-selection information to the optimizer 114C and outputs the first selected feature amount to the third selector 1130-3.

After the first non-selection information is generated, the optimizer 114C receives input of the first non-selection information from the first selector 1130-1. The optimizer 114C generates first release instruction information based on the first non-selection information and outputs the first release instruction information to the memory 112C.

After the first release instruction information is generated, the memory 112C receives input of the first release instruction information. In accordance with the first release instruction information, the memory 112C releases unnecessary data among the two pieces of stored processing process data. At this point, the memory 112C stores a piece of processing process data.

The third extractor 1120-3 receives input of the third processed image from the processed image generator 1110. The third extractor 1120-3 generates a third feature amount by performing third extraction processing that corresponds to feature amount extraction processing with respect to the third processed image. The third extractor 1120-3 outputs the third feature amount to the second selector 1130-2 and outputs third processing process data that is generated during the process of the third extraction processing to the memory 112C.

The feature amount extraction processing in the third extractor 1120-3 is performed at a timing where only one piece of processing process data is stored in the memory 112C when outputting the third processing process data to the memory 112C. Alternatively, the feature amount extraction processing in the third extractor 1120-3 is performed in a state where a piece of processing process data is stored in the memory 112C.

After the third feature amount is extracted, the memory 112C receives input of the third processing process data from the third extractor 1120-3 and stores the third processing process data. At this point, the memory 112C stores two pieces of processing process data.

The fourth extractor 1120-4 receives input of the fourth processed image from the processed image generator 1110. The fourth extractor 1120-4 generates a fourth feature amount by performing fourth extraction processing that corresponds to feature amount extraction processing with respect to the fourth processed image. The fourth extractor 1120-4 outputs the fourth feature amount to the second selector 1130-2 and outputs fourth processing process data that is generated during the process of the fourth extraction processing to the memory 112C.

The fourth extraction processing in the fourth extractor 1120-4 may be performed at a same timing as the third extraction processing in the third extractor 1120-3.

After the fourth feature amount is extracted, the memory 112C receives input of the fourth processing process data from the fourth extractor 1120-4 and stores the fourth processing process data. At this point, the memory 112C stores three pieces of processing process data.

To summarize the configuration shown in FIG. 11, while the configuration is a combination of configurations in which two feature amounts are compared with each other in a selector as shown in FIG. 6, a configuration is included in which outputs from different selectors (in other words, two selected feature amounts) are compared with each other. Accordingly, while three pieces of processing process data are to be stored in the memory 112C, the feature amount extractor 111C can simultaneously perform extraction processing with two extractors. In other words, the feature amount extractor 111C can generate four feature amounts for every two feature amounts.

Furthermore, by expanding N-number of processed images to the selectors that compare a plurality of feature amounts, the feature amount extractor 111C can generate N-number of feature amounts for every plurality of feature amounts. Accordingly, the image processing apparatus 110 can improve throughput of feature amount extraction processing while reducing an amount of memory use than before.

This concludes the description of a configuration of a maximum feature amount selector including selectors that compare outputs from different selectors. Next, an operation of the image processing apparatus 110 configured in this manner will be described with reference to FIG. 12.

FIG. 12 is a flow chart illustrating another operation of the image processing apparatus 110 according to the first embodiment. The flow chart in FIG. 12 shows a flow of a series of maximum feature amount selection processing with respect to an input image. In addition, the flow chart in FIG. 12 is premised on a configuration in which two selected feature amounts are compared with each other in a selector as shown in FIG. 11 and the number of processed images has been expanded to N. The respective components in FIGS. 1 and 11 will be referred to in the following description.

(Step ST1201)
When the image processing apparatus 110 acquires an input image, the processed image generator 1110 generates N-number of (N≥4) processed images based on the input image.

(Step ST1202)
The processing of step ST1202 is similar to the processing from step ST702 to step ST707 in FIG. 7. Specifically, the first extractor 1120-1 generates a first feature amount by performing first extraction processing with respect to a first processed image. The memory 112C stores first processing process data that is generated during the process of the first extraction processing. The second extractor 1120-2 generates a second feature amount by performing second extraction processing with respect to a second processed image. The memory 112C stores second processing process data that is generated during the process of the second extraction processing. The first selector 1130-1 compares the first feature amount and the second feature amount with each other and selects whichever is larger as a first selected feature amount. The optimizer 114C releases processing process data corresponding to a feature amount not having been selected in the comparison between the first feature amount and the second feature amount from the memory 112C.

(Step ST1203)
The image processing apparatus 110 defines a variable i and a variable j and respectively assigns 3 and 2 to the variables.

(Step ST1204)
An i-th extractor 620-$i$ generates an i-th feature amount by performing i-th extraction processing with respect to an i-th processed image.

(Step ST1205)
The memory 112C stores i-th processing process data that is generated during the process of the i-th extraction processing. At this point, the memory 112C stores two pieces of processing process data.

(Step ST1206)
An (i+1)-th extractor 620-($i$+1) generates an (i+1)-th feature amount by performing (i+1)-th extraction processing with respect to an (i+1)-th processed image.

(Step ST1207)
The memory 112C stores (i+1)-th processing process data that is generated during the process of the (i+1)-th extraction processing. At this point, the memory 112C stores three pieces of processing process data.

(Step ST1208)
An (i−1)-th selector 1130-($i$−1) compares the i-th selected feature amount and the (i+1)-th feature amount with each other and selects whichever is larger as a j-th selected feature amount.

(Step ST1209)
The optimizer 114C releases processing process data corresponding to a feature amount not having been selected in the comparison between the i-th feature amount and the (i+1)-th feature amount from the memory 112C. Accordingly, the memory 112C stores two pieces of processing process data.
(Step ST1210)

An i-th selector 1130-i compares a (j−1)-th selected feature amount and the j-th selected feature amount with each other and selects whichever is larger as a (j+1)-th selected feature amount.
(Step ST1211)

The optimizer 114C releases processing process data corresponding to a feature amount not having been selected in the comparison between the (j−1)-th selected feature amount and the j-th selected feature amount from the memory 112C. Accordingly, the memory 112C stores only a piece of processing process data.
(Step ST1212)

The image processing apparatus 110 determines whether or not the variable i is (N−1). When the variable i is not (N−1), processing is advanced to step ST1213. On the other hand, when the variable i is (N−1), the image processing apparatus 110 outputs a selected feature amount selected in immediately-preceding selection processing as a maximum feature amount to the error calculator 120, outputs processing process data related to the maximum feature amount to the learner 130, and ends the processing.
(Step ST1213)

The image processing apparatus 110 respectively adds 2 to the variable i and the variable j. After the processing of step ST1213, the processing returns to step ST1204.

Note that processing of step ST1204 and processing of step ST1206 may be performed at the same timing.
(Another Embodiment of Feature Amount Extractor)

A configuration of using a plurality of processed images based on an input image and performing feature amount extraction processing with respect to each of the plurality of processed images was described above. In other words, in the configuration described above, an individual neural network was used with respect to each of a plurality of processed images. Hereinafter, a configuration that enables a memory capacity to be reduced than before while performing processing using a neural network with respect to an input image will be described with reference to FIG. 13 to FIG. 15.

Figure 13:
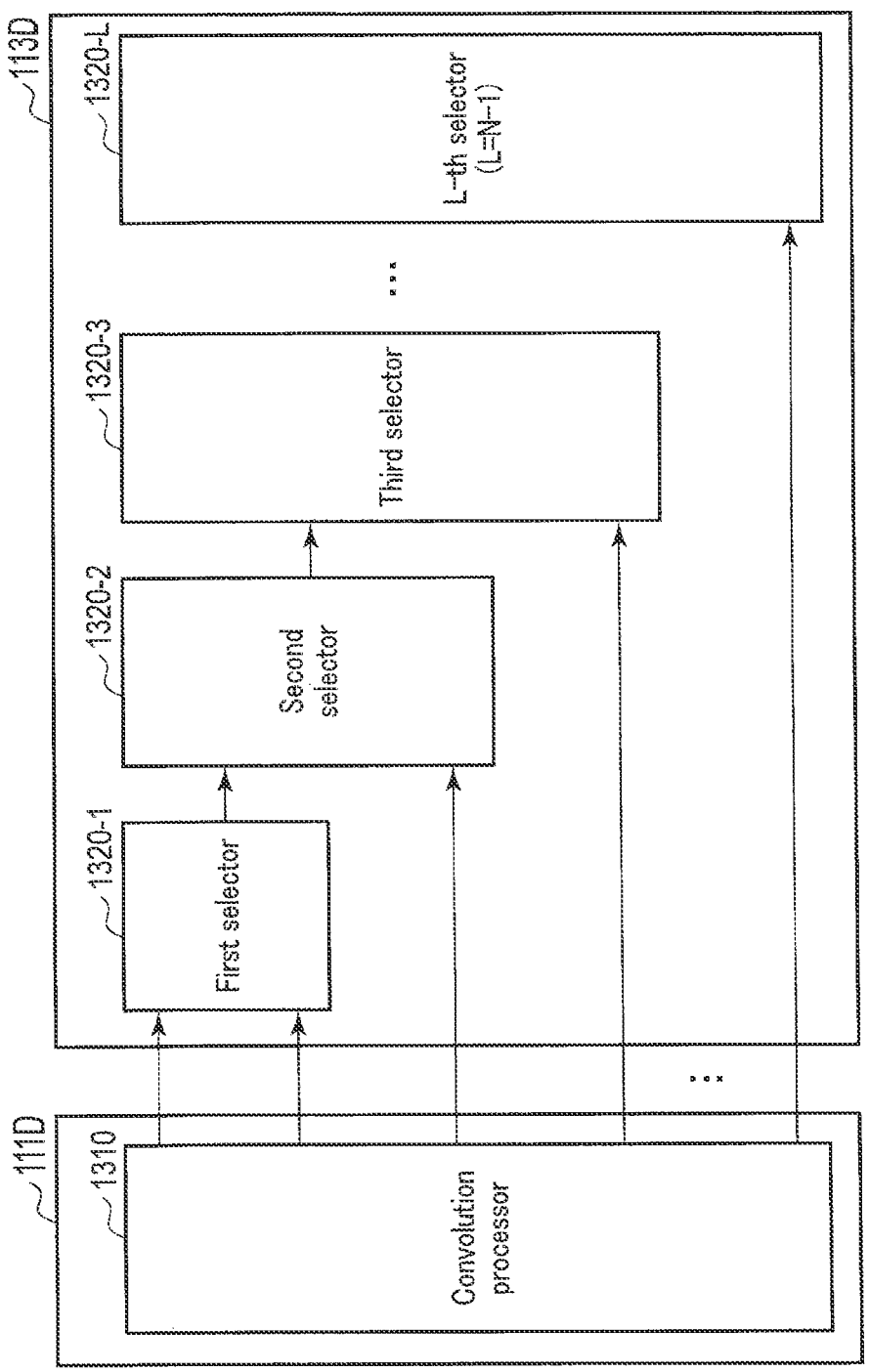
FIG. 13 is a block diagram showing another (a third) configuration example of the feature amount extractor and the maximum feature amount selector in the image processing apparatus in FIG. 6.

FIG. 13 is a block diagram showing another (a third) configuration example of the feature amount extractor 111A and the maximum feature amount selector 113A in the image processing apparatus 110 shown in FIG. 6. The third configuration example is based on the processing using N-number of feature amounts shown in FIG. 6 and represents a change in how the N-number of processed images are handled. Therefore, in FIG. 13, the feature amount extractor 111A will be described as a feature amount extractor 111D and the maximum feature amount selector 113A will be described as a maximum feature amount selector 113D. In FIG. 13, illustration of the memory 112 and the optimizer 114 in the image processing apparatus 110 has been omitted.

The feature amount extractor 111D comprises a convolution processor 1310. The maximum feature amount selector 113D comprises a first selector 1320-1 to an L-th selector 1320-L. In this case, L equals (N−1).

The convolution processor 1310 generates an intermediate image from an input image by performing convolution processing as feature amount extraction processing, breaks the intermediate image down to N-number of blocks (N blocks) of one or more horizontal and vertical pixels, and generates N-number of feature amounts with respect to each of the N-number of blocks. At this point, the convolution processor 1310 performs convolution processing in units of a specific region instead of the input image all at once. The specific region refers to a region in the input image that affects a block in an intermediate image. Hereinafter, a relationship between the input image and the intermediate image will be described with reference to FIG. 14.

Figure 14:
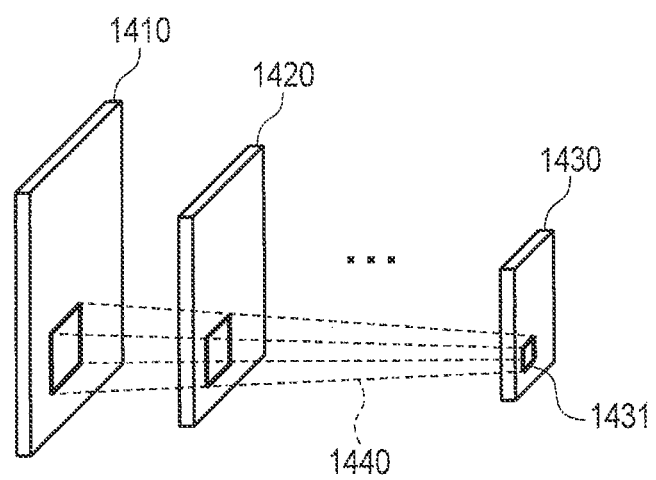
FIG. 14 is an explanatory diagram illustrating a plurality of transformed images, an intermediate image, and a receptive field in convolution processing with respect to an input image.

FIG. 14 is an explanatory diagram illustrating a plurality of transformed images 1420, an intermediate image 1430, and a receptive field 1440 in convolution processing with respect to an input image 1410. Usually, through convolution processing, the transformed image 1420 is generated from the input image 1410 and, by repetitively performing convolution processing, the intermediate image 1430 being a transformed image generated last is generated. At this point, a block 1431 in the intermediate image 1430 is in a correspondence relationship (the receptive field 1440) with a region in the transformed image 1420 and a region in the input image 1410. An example of an intermediate image will be described with reference to FIG. 15.

Figure 15:
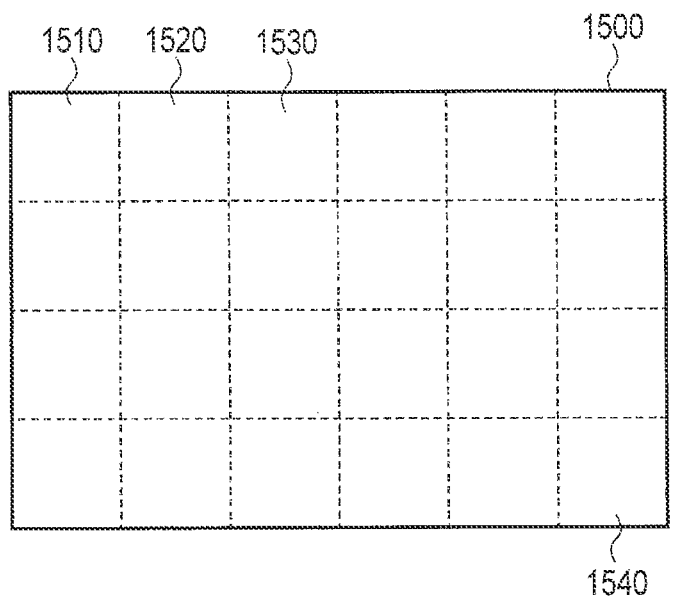
FIG. 15 is an intermediate image divided into each processing unit of convolution processing.

FIG. 15 is an intermediate image 1500 divided into each processing unit of convolution processing. FIG. 15 shows an example of the intermediate image 1500 divided vertically and horizontally into four×six blocks. Each divided block corresponds to the specific region described above. In other words, the convolution processor 1310 generates, for each specific block, the intermediate image 1500 that is generated by normal convolution processing. Accordingly, the convolution processor 1310 can perform, with a single neural network, processing equivalent to that performed by an individual neural network on each of a plurality of processed images.

Specifically, the convolution processor 1310 specifies a region of an input image based on a receptive field of the block 1510 in the intermediate image 1500 and performs feature amount extraction processing by considering the specified region as a first processed image. A block 1520 following the block 1510 corresponds to a second processed image, and a further following block 1530 corresponds to a third processed image. In addition, after performing feature amount extraction processing of a 24th processed image corresponding to a last block 1540, the convolution processor 1310 ends the processing with respect to the input image.

Note that the feature amount extractor 111D shown in FIG. 13 and described above only differs from the other feature amount extractors in an extraction method of a feature amount and, for example, processing similar to that of the maximum feature amount selector 113A shown in FIG. 6 may be performed as subsequent processing by the maximum feature amount selector 113D.

In addition, relationships of an intermediate image and a receptive field with respect to an input image can be optionally set. For example, by setting a receptive field that causes a region of an input image to overlap with respect to each adjacent block of an intermediate image, feature amount extraction processing can be performed by assuming a processed image such as that shown in FIG. 5.
(Other Embodiments of Input Image)

An input image of one channel (for example, a black-and-white image) is assumed in the description presented above. However, an input image may be an RGB color image. When using a color image as an input image, the image processing apparatus 110 handles one input image as three images of a Red component, a Green component, and a Blue component that have the same numbers of vertical and horizontal pixels or, in other words, as a so-called three-channel image. In this case, the image processing apparatus 110 uses a three-dimensional kernel such as 3×3 pixels×3 channels. In addition, in feature amount extraction processing, the image processing apparatus 110 may perform transformation processing of two or more channels. In image recognition processing using a neural network, it is generally known that the larger the number of channels of a transformed image, the higher the recognition accuracy. Therefore, even in the present embodiment, the number of channels may be set as needed.

(Another Embodiment of Feature Amount)

A feature amount is assumed to be generated as a scalar value in the description presented above. However, a feature amount may be a vector with a plurality of elements. For example, when objects of different types such as a crack and a stain are to be simultaneously recognized while being distinguished from each other, the image processing apparatus 110 generates, as a feature amount, a vector with the same number of dimensions as the number of types of objects that are recognition objects.

Specifically, when performing full-connection in final processing in an individual neural network, the image processing apparatus 110 matches the number of channels of an output of full-connection to the number of types to be recognized, arranges the channels, and adopts the channels as a feature amount. Alternatively, when performing average pooling or max pooling in final processing in an individual neural network, the image processing apparatus 110 matches the number of channels of an intermediate image to the number of types to be recognized, arranges pooled values for each channel, and adopts the values as a vector of a feature amount. An intermediate image with a plurality of channels and each feature amount will be described with reference to FIG. 16.

Figure 16:
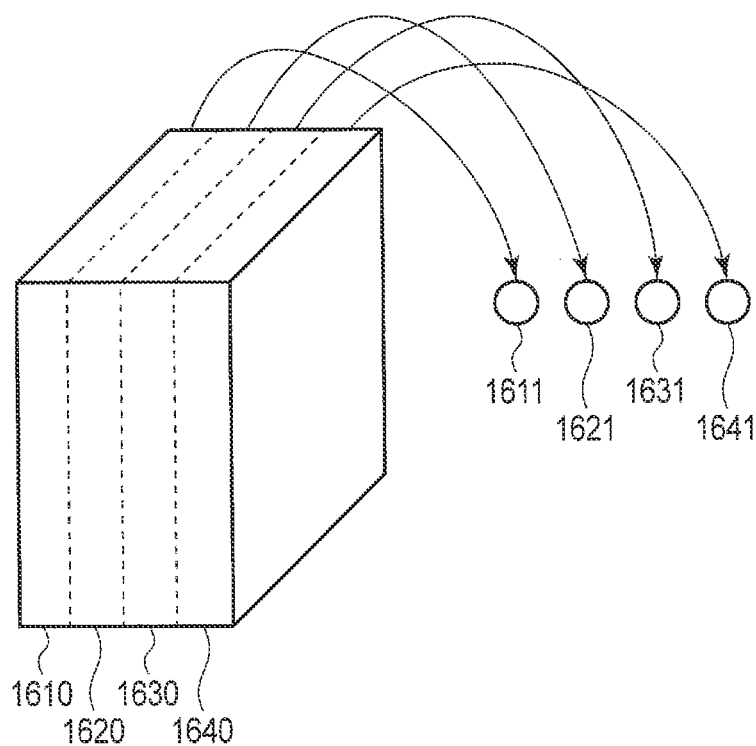
FIG. 16 is an explanatory diagram illustrating a relationship between an intermediate image with a plurality of channels and a feature amount for each channel.

FIG. 16 is an explanatory diagram illustrating a relationship between an intermediate image with a plurality of channels and a feature amount for each channel. FIG. 16 shows an intermediate image with four channels 1610 to 1640. With respect to the intermediate image, the image processing apparatus 110 generates a feature amount as a vector in which is arranged an individual feature amount 1611 corresponding to the channel 1610, an individual feature amount 1621 corresponding to the channel 1620, an individual feature amount 1631 corresponding to the channel 1630, and an individual feature amount 1641 corresponding to the channel 1640.

Next, processing in a selector, an optimizer, and an error calculator when a feature amount is a vector will be described. Hereinafter, a case where the feature amount is a vector with two elements will be described. For example, when comparing two feature amounts with each other, the selector performs a comparison for each element of the vector of each feature amount and outputs, as a selected feature amount, the vector from which a larger element had been selected. At this point, the optimizer releases processing process data related to a feature amount in which none of respective elements of a vector had been selected from the memory. In addition, the error calculator calculates an error value represented by a vector based on each element of a maximum feature amount and a correct feature amount that corresponds to each element of a vector.

As described above, by adopting a vector as a feature amount, objects of different types can be simultaneously recognized while being distinguished from each other. In addition, even in this case, the image processing apparatus 110 need not store all pieces of processing process data in a memory as before and a capacity of the memory can be reduced.

When adopting a configuration in which each channel is made independent so that a data value of a channel does not affect other channels in an individual neural network, when comparing elements in a selector, processing process data related to an element not having been selected among two feature amounts is released from a memory. Accordingly, memory capacity can be further reduced.

As described above, in an image processing apparatus according to the first embodiment, with respect to N-number of (N≥3) processed images based on an input image, N-number of feature amounts are generated by performing feature amount extraction processing using a neural network, processing process data generated during a process of the feature amount extraction processing is stored in a memory, a maximum feature amount is selected by performing two or more comparisons with M-number of combinations among the N-number of feature amounts, M being 2 or more and (N−1) or less, and (M−1)-number or less pieces of processing process data that correspond to (M−1)-number or less feature amounts not having been selected are released from the memory for each of the two or more comparisons.

Therefore, since the image processing apparatus according to the first embodiment can release unnecessary processing process data from the memory as needed during a process until a maximum feature amount in the input image is extracted, memory capacity necessary for image processing using a neural network can be reduced.

In addition, a learning apparatus including the image processing apparatus according to the first embodiment calculates an error value based on a maximum feature amount and a correct feature amount that corresponds to an input image, and trains a neural network based on processing process data related to the maximum feature amount that is finally stored in a memory and an error value.

Therefore, the learning apparatus can reduce a necessary memory capacity during training of a neural network.

Second Embodiment

A learning apparatus including an image processing apparatus has been described in the first embodiment. On the other hand, an inference apparatus including an image processing apparatus will be described in a second embodiment. A configuration of the image processing apparatus according to the second embodiment is approximately similar to the configuration of the image processing apparatus according to the first embodiment. On the other hand, the image processing apparatus according to the second embodiment differs from the image processing apparatus according to the first embodiment in a type of processing process data to be stored in a memory.

Figure 17:
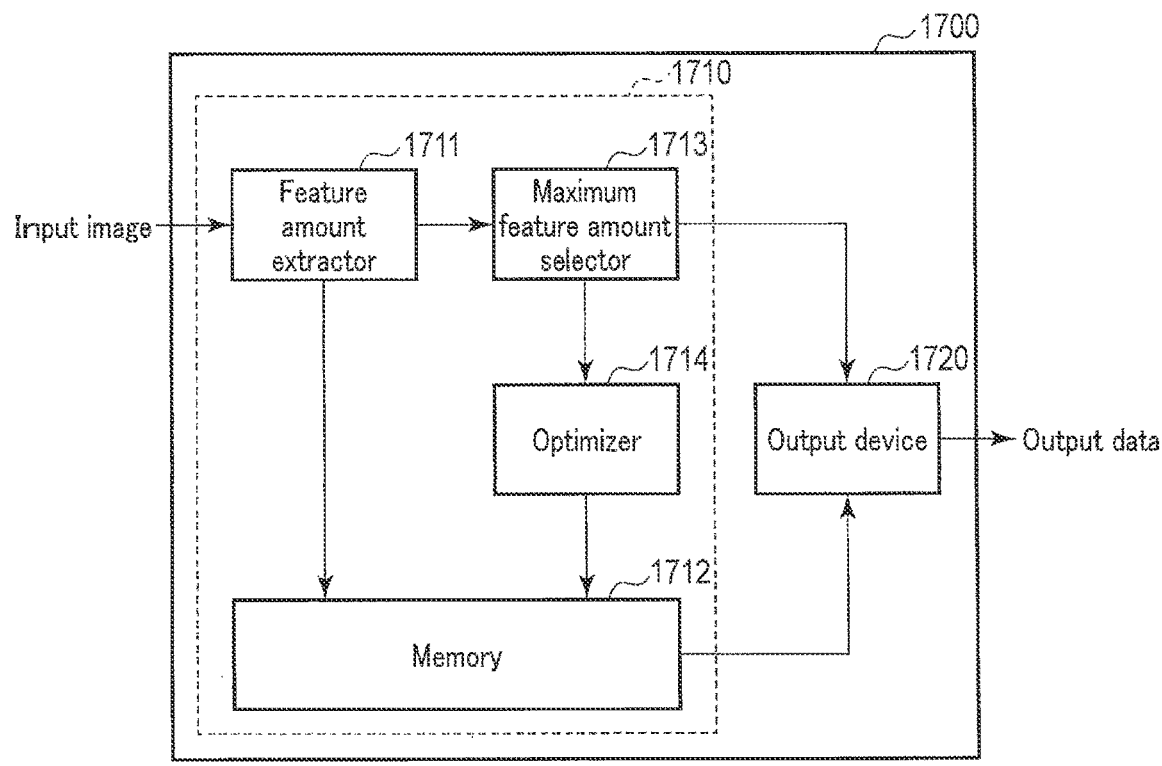
FIG. 17 is a block diagram illustrating a configuration of an inference apparatus including an image processing apparatus according to a second embodiment.

FIG. 17 is a block diagram illustrating a configuration of an inference apparatus 1700 including an image processing apparatus 1710 according to the second embodiment. The inference apparatus 1700 comprises the image processing apparatus 1710 (image processor) and an output device 1720. The image processing apparatus 1710 comprises a feature amount extractor 1711, a memory 1712, a maximum feature amount selector 1713, and an optimizer 1714.

The inference apparatus 1700 may comprise an acquirer which acquires an input image to be used in inference by a neural network. In addition, the inference apparatus 1700 may comprise a controller for controlling each component.

Since the feature amount extractor 1711, the memory 1712, the maximum feature amount selector 1713, and the optimizer 1714 are configured in an approximately similar manner to, for example, the feature amount extractor 111, the memory 112, the maximum feature amount selector 113, and the optimizer 114 shown in FIG. 1, overlapping descriptions will be omitted.

The memory 1712 differs from the memory 112 shown in FIG. 1 in that the memory 1712 outputs processing process data related to a maximum feature amount to the output device 1720. The maximum feature amount selector 1713 differs from the maximum feature amount selector 113 shown in FIG. 1 in that the maximum feature amount selector 1713 outputs a maximum feature amount to the output device 1720.

The output device 1720 receives input of a maximum feature amount from the maximum feature amount selector 1713 and receives input of processing process data related to the maximum feature amount from the memory 1712. The output device 1720 generates an inference result based on the maximum feature amount and outputs the inference result to another device. The inference result is, for example, information representing whether or not an object that is a recognition object is present in an input image.

Specifically, the output device 1720 generates the inference result by comparing the maximum feature amount and a threshold with each other. For example, when the maximum feature amount is equal to or lower than the threshold, the output device 1720 outputs an inference result representing that the object that is a recognition object is not present in the input image, but when the maximum feature amount is larger than the threshold, the output device 1720 outputs an inference result representing that the object that is a recognition object is present in the input image. When the maximum feature amount is represented by a value ranging from "0" to "1", an example of the threshold is "0.5".

Next, types of processing process data handled by the image processing apparatus 1710 will be described. For example, the processing process data in the second embodiment is a part of an intermediate image. Since the processing process data is used when presenting an inference result to be described later, the processing process data may be rephrased as data necessary for presenting an inference result. The processing process data in the second embodiment may further include a processed image.

As a significance of storing an intermediate image, it is known that an intermediate image corresponding to a maximum feature amount corresponds to a position of an object in an input image and a pixel value thereof increases. This is described in, for example, non-patent literature "Neural networks for minuscule object detection" (Vision Engineering Workshop 2020, IS1-03, pp. 32-37, December 2020). Therefore, by storing an intermediate image in the memory, when presenting an inference result, an input image indicating a portion with an increased pixel value in the intermediate image can be displayed together. Due to the display, since a user can visually check a recognition result, describability of a neural network can be improved.

Next, a relationship between an intermediate image as processing process data and a partial image among an intermediate image stored in a memory will be described with reference to FIGS. 18 to 20.

Figure 18:
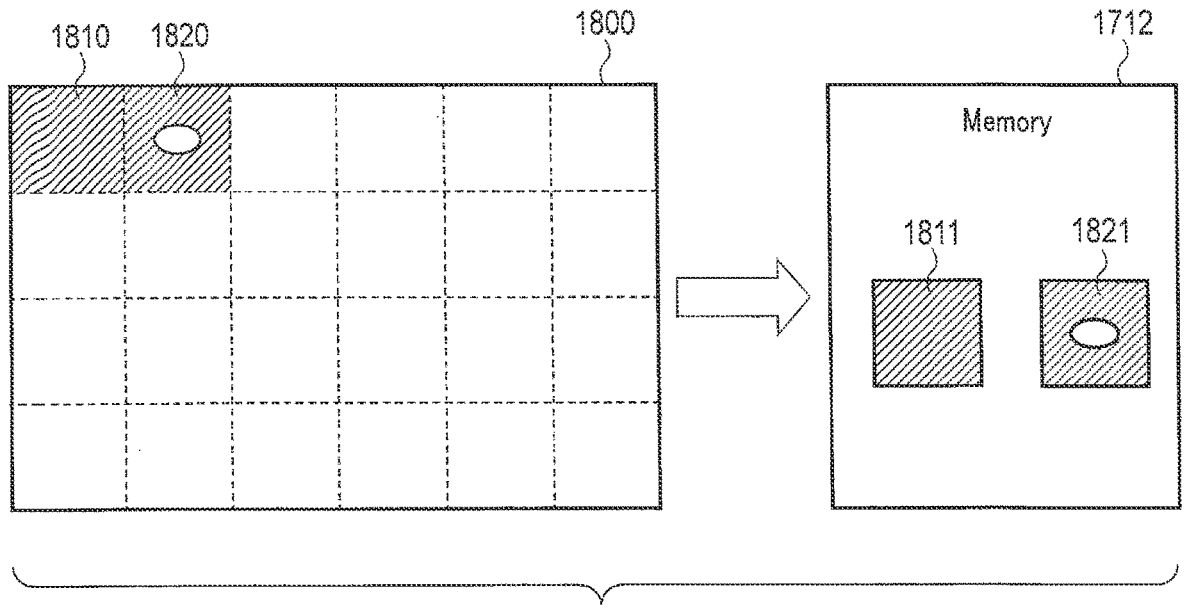
FIG. 18 is an explanatory diagram illustrating a relationship between a convoluted partial image and partial image data to be stored in a memory.

FIG. 18 is an explanatory diagram illustrating a relationship between a convoluted partial image and partial image data stored in a memory. FIG. 18 shows a state after performing feature amount extraction processing on first two partial images 1810 and 1820 among an intermediate image 1800. In this example, the partial image 1820 includes an object that is a recognition object and a pixel value at an object position has been increased. At this point, the memory 1712 stores partial image data 1811 corresponding to the partial image 1810 and partial image data 1821 corresponding to the partial image 1820. Subsequently, it is assumed that the maximum feature amount selector 1713 has selected a feature amount corresponding to the partial image 1820 by selection processing.

Figure 19:
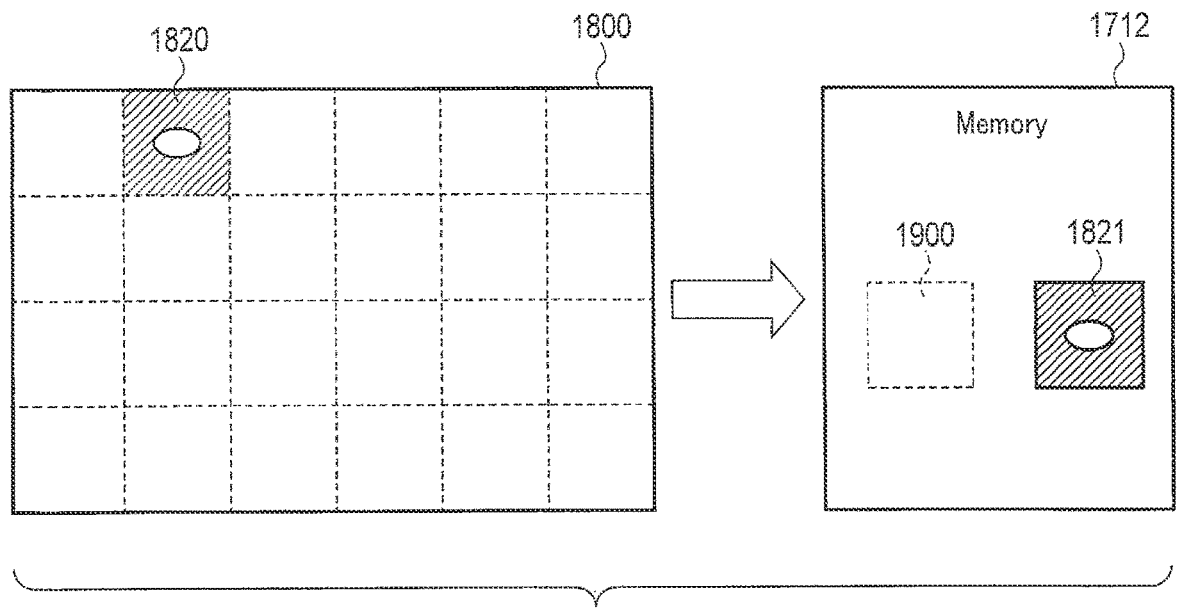
FIG. 19 is an explanatory diagram illustrating partial image data to be released from a memory.

FIG. 19 is an explanatory diagram illustrating partial image data to be released from a memory. FIG. 19 shows only the partial image 1820 selected by selection processing. At this point, only the partial image data 1821 is stored in the memory 1712 and a release region 1900 resulting from releasing the partial image data 1811 corresponding to the partial image 1810 not having been selected by the selection processing is created in the memory 1712. Subsequently, it is assumed that the feature amount extractor 1711 performs feature amount extraction processing with respect to a new partial image.

Figure 20:
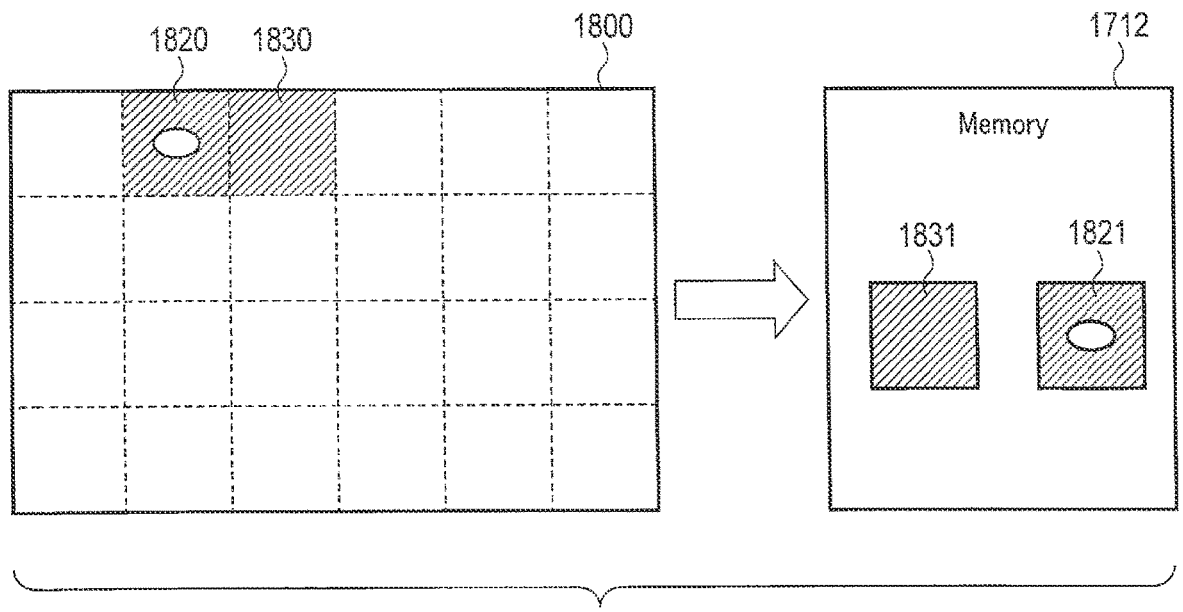
FIG. 20 is an explanatory diagram illustrating new partial image data to be stored in a memory.

FIG. 20 is an explanatory diagram illustrating new partial image data to be stored in a memory. FIG. 20 shows a state after performing feature amount extraction processing on a partial image 1830 that follows the partial image 1820 among the intermediate image 1800. At this point, the memory 1712 stores the partial image data 1811 and partial image data 1831 corresponding to the partial image 1830.

Subsequently, the image processing apparatus 1710 similarly advances processing with respect to other partial images among the intermediate image 1800 by repetitively storing partial image data in the memory 1712 and then releasing the partial image data. In addition, the image processing apparatus 1710 outputs partial image data that is last stored in the memory 1712 as processing process data to the output device 1720.

The output device 1720 may generate a composite image based on processing process data including partial image data and an input image. The composite image is, for example, an image in which pixels of an object that is a recognition object appearing in an input image have been enhanced by blend composition. In other words, the composite image represents an inference result being visualized and reflected on an input image. At this point, the output device 1720 may generate an interpolated intermediate image by interpolating partial image data not stored in the memory 1712. An interpolated intermediate image will be described with reference to FIG. 21.

Figure 21:
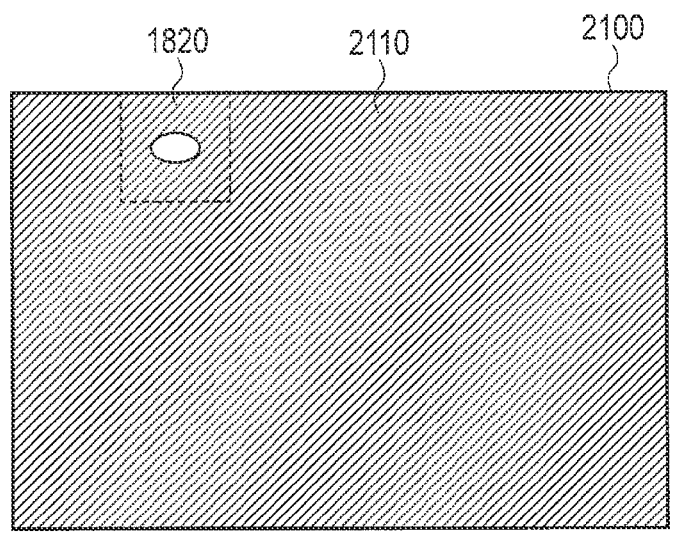
FIG. 21 is an interpolated intermediate image generated from a partial image.

FIG. 21 is an interpolated intermediate image 2100 generated from the partial image 1820. The output device 1720 generates the interpolated intermediate image 2100 by performing, for example, zero padding with respect to a region 2110 other than the partial image 1820. Accordingly, since an intermediate image corresponding to the input image can be restored, the output device 1720 can perform composition. Since a partial image and an interpolated intermediate image can be regarded as representing contents of an inference result, the images can be referred to as inference images that visualize the inference result.

(Another Configuration Example of Maximum Feature Amount Selector)

Unlike the learning apparatus described in the first embodiment, the memory in the inference apparatus may store processing process data related to a feature amount not having been selected by satisfying a predetermined condition. The predetermined condition is that the feature amount is equal to or larger than a threshold. Specifically, each selector of the maximum feature amount selector 1713 performs comparison processing in which a feature amount not having been selected is compared with a threshold. In addition, when the feature amount not having been selected is equal to or larger than the threshold, the maximum feature amount selector 1713 does not generate non-selection information related to the feature amount. Accordingly, since a plurality of pieces of processing process data are to be stored in the memory 1712, the inference apparatus 1700 can accommodate cases where an input image includes a plurality of objects that are recognition objects. In this case, the inference apparatus 1700 may output an inference result based on a maximum feature amount and a feature amount that is equal to or larger than a threshold.

As described above, in an similar manner to the image processing apparatus according to the first embodiment, in an image processing apparatus according to a second embodiment, with respect to N-number of (N≥3) processed images based on an input image, N-number of feature amounts are generated by performing feature amount extraction processing using a neural network, processing process data generated during a process of the feature amount extraction processing is stored in a memory, a maximum feature amount is selected by performing two or more comparisons with M-number of combinations among the N-number of feature amounts, M being 2 or more and (N−1) or less, and (M−1)-number or less pieces of processing process data that correspond to (M−1)-number or less feature amounts not having been selected are released from the memory for each of the two or more comparisons.

Therefore, the image processing apparatus according to the second embodiment is expected to produce a similar advantageous effect to the image processing apparatus according to the first embodiment.

In addition, an inference apparatus including the image processing apparatus according to the second embodiment outputs an inference result representing whether or not an object that is a recognition object is present in an input image based on a maximum feature amount. Furthermore, the inference apparatus further compares each of M-number of feature amounts and a threshold with each other for every two comparisons or more in the image processing apparatus and does not release, from a memory, processing process data corresponding to a feature amount equal to or larger than the threshold among (M−1) number or less feature amounts not having been selected for every two comparisons or more. In addition, the inference apparatus outputs an inference result based on a maximum feature amount and a feature amount that is equal to or larger than the threshold. Furthermore, when processing process data is an inference image created by visualizing an inference result, the inference apparatus further outputs an image in which pixels of an output device that is a recognition object appearing in an input image have been enhanced based on the input image and the inference image.

Therefore, the inference apparatus can reduce a memory capacity necessary during inference using a neural network.

(Hardware Configuration)

Figure 22:
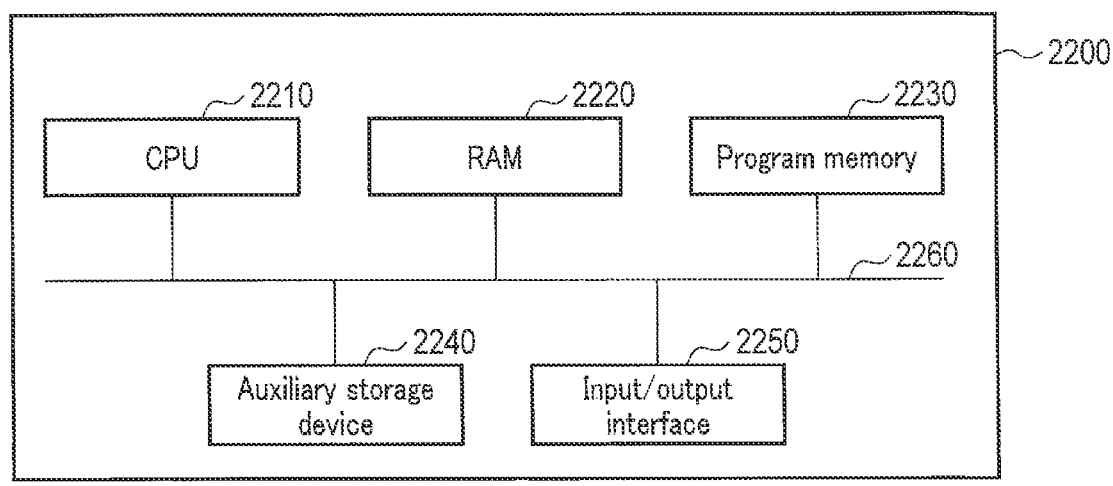
FIG. 22 is a block diagram illustrating a hardware configuration of a computer according to an embodiment.

FIG. 22 is a block diagram illustrating a hardware configuration of a computer 2200 according to an embodiment. The computer 2200 comprises, as hardware, a CPU (Central Processing Unit) 2210, a RAM (Random Access Memory) 2220, a program memory 2230, an auxiliary storage device 2240, and an input/output interface 2250. The CPU 2210 communicates with the RAM 2220, the program memory 2230, the auxiliary storage device 2240, and the input/output interface 2250 via a bus 2260.

The CPU 2210 is an example of a general-purpose processor. The RAM 2220 is used by the CPU 2210 as a working memory. The RAM 2220 includes a volatile memory such as an SDRAM (Synchronous Dynamic Random Access Memory). The program memory 2230 stores various programs including a program related to maximum feature amount selection processing (a maximum feature amount selection program). As the program memory 2230, for example, a ROM (Read-Only Memory), a part of the auxiliary storage device 2240, or a combination thereof is used. The auxiliary storage device 2240 stores data in a non-transitory manner. The auxiliary storage device 2240 includes a non-volatile memory such as an HDD or an SSD.

The input/output interface 2250 is an interface for connecting to another device. For example, the input/output interface 2250 is used to connect to another device.

Each program stored in the program memory 2230 includes a computer-executable instruction. When executed by the CPU 2210, the program (computer-executable instruction) causes the CPU 2210 to execute predetermined processing. For example, when executed by the CPU 2210, the maximum feature amount selection program or the like causes the CPU 2210 to execute the series of processing described in relation to the respective components shown in FIGS. 1, 3, 6, 8, 11, 13, and 17.

The program may be provided to the computer 2200 in a state of being stored in a computer-readable storage medium. In this case, for example, the computer 2200 further comprises a drive (not illustrated) for reading data from the storage medium and acquires the program from the storage medium. Examples of a storage medium include a magnetic disk, an optical disk (such as a CD-ROM, a CD-R, a DVD-ROM, or a DVD-R), a magneto optical disk (such as an MO), and a semiconductor memory. In addition, a program may be stored in a server on a communication network and the computer 2200 may download the program from the server using the input/output interface 2250.

Processing described in the embodiments is not limited to being performed due to a general-purpose hardware processor such as the CPU 2210 executing the program and may be performed by an exclusive hardware processor such as an ASIC (Application Specific Integrated Circuit). The term processing circuitry (processor) includes at least one general-purpose hardware processor, at least one exclusive hardware processor, and a combination of at least one general-purpose hardware processor and at least one exclusive hardware processor. In the example shown in FIG. 22, the CPU 2210, the RAM 2220, and the program memory 2230 correspond to processing circuitry.

Therefore, according to each embodiment described above, memory capacity necessary for image processing using a neural network can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising processing circuitry configured to:
generate, for N processed images based on an input image, N being an integer equal to greater than 3, N feature amounts by performing feature amount extraction processing using a neural network;

store process data generated during the feature amount extraction processing in a memory;

select a maximum feature amount by performing two or more comparisons with M combinations among the N feature amounts, M being an integer equal to 2 or more and (N−1) or less; and release (M−1) or less pieces of process data that correspond to (M−1) or less feature amounts not having been selected from the memory for each of the two or more comparisons.

2. The image processing apparatus according to claim 1, wherein the processing circuitry is further configured to generate the N processed images by segmenting a part of the input image.

3. The image processing apparatus according to claim 1, wherein the processing circuitry is further configured to perform the feature amount extraction processing using the neural network with a same parameter when generating the N feature amounts.

4. The image processing apparatus according to claim 1, wherein the processing circuitry is further configured to generate the N processed images with different reduction ratios by reducing the input image.

5. The image processing apparatus according to claim 4, wherein the processing circuitry is further configured to perform the feature amount extraction processing using the neural network with mutually different parameters when generating the N feature amounts.

6. The image processing apparatus according to claim 1, wherein
the N processed images correspond to N regions in the input image which respectively correspond to N blocks of one or more horizontal and vertical pixels created by breaking down an intermediate image which may be generated by performing convolution processing on the input image into the N blocks,
the feature amount extraction processing is the convolution processing, and
the processing circuitry is further configured to generate, for the N regions, the N feature amounts that correspond to each of the N blocks by performing the convolution processing.

7. The image processing apparatus according to claim 6, wherein the processing circuitry is further configured to generate the N feature amounts by selecting an addition, an average, or a maximum value for each of the N blocks.

8. The image processing apparatus according to claim 1, wherein each of the N feature amounts is a vector with a plurality of elements.

9. The image processing apparatus according to claim 8, wherein
the processing circuitry is further configured to select, in each of the two or more comparisons, a large element by performing a comparison for every plurality of elements, and
the maximum feature amount corresponds to a vector that combines a largest element among the N feature amounts.

10. The image processing apparatus according to claim 9, wherein the processing circuitry is further configured to release, for each comparison for selecting the maximum feature amount, process data corresponding to an element not having been selected from the memory.

11. The image processing apparatus according to claim 1, wherein the processing circuitry is further configured to generate the N feature amounts sequentially or for every plurality of feature amounts.

12. The image processing apparatus according to claim 1, wherein the processing circuitry is further configured to store up to an upper limit of M pieces of process data corresponding to the M feature amounts in the memory.

13. The image processing apparatus according to claim 1, wherein the processing circuitry is further configured to include a comparison in which the numbers of M combinations differ from each other in the two or more comparisons.

14. The image processing apparatus according to claim 1, wherein
the N processed images include a first processed image, a second processed image, and a third processed image,
the feature amount extraction processing includes first extraction processing, second extraction processing, and third extraction processing,
the N feature amounts include a first feature amount, a second feature amount, and a third feature amount, and
the processing circuitry is further configured to:
generate the first feature amount by performing the first extraction processing with respect to the first processed image;
store first process data that is generated during the first extraction processing in the memory;
generate the second feature amount by performing the second extraction processing for the second processed image;
store second process data that is generated during the second extraction processing in the memory;
compare the first feature amount and the second feature amount with each other and selecting whichever is larger as a first selected feature amount;
release process data corresponding to a feature amount not having been selected in the selection of the first selected feature amount from the memory;
generate the third feature amount by performing the third extraction processing for the third processed image;
store third process data that is generated during the third extraction processing in the memory;
compare the first selected feature amount and the third feature amount with each other and selecting whichever is larger as a second selected feature amount; and
release process data corresponding to a feature amount not having been selected in the selection of the second selected feature amount from the memory.

15. The image processing apparatus according to claim 1, wherein
the N is an integer equal to four or more,
the N processed images include a first processed image, a second processed image, a third processed image, and a fourth processed image,
the feature amount extraction processing includes first extraction processing, second extraction processing, third extraction processing, and fourth extraction processing,
the N feature amounts include a first feature amount, a second feature amount, a third feature amount, and a fourth feature amount, and
the processing circuitry is further configured to:
generate the first feature amount by performing the first extraction processing for the first processed image;
store first process data that is generated during the first extraction processing in the memory;
generate the second feature amount by performing the second extraction processing for the second processed image;
store second process data that is generated during the second extraction processing in the memory;

compare the first feature amount and the second feature amount with each other and selecting whichever is larger as a first selected feature amount;

release process data corresponding to a feature amount not having been selected in the selection of the first selected feature amount from the memory;

generate the third feature amount by performing the third extraction processing for the third processed image;

store third processing process data that is generated during the third extraction processing in the memory;

generate the fourth feature amount by performing the fourth extraction processing for the fourth processed image;

store fourth process data that is generated during the fourth extraction processing in the memory;

compare the third feature amount and the fourth feature amount with each other and selecting whichever is larger as a second selected feature amount;

release process data corresponding to a feature amount not having been selected in the selection of the second selected feature amount from the memory;

compare the first selected feature amount and the second selected feature amount with each other and selecting whichever is larger as a third selected feature amount; and release process data corresponding to a feature amount not having been selected in the selection of the third selected feature amount from the memory.

16. A learning apparatus comprising the image processing apparatus according to claim 1, wherein the processing circuitry is further configured to:

calculate an error value based on the maximum feature amount and a correct feature amount that corresponds to the input image; and train the neural network based on process data related to the maximum feature amount that is finally stored in a memory and the error value.

17. An inference apparatus comprising the image processing apparatus according to claim 1, wherein the processing circuitry is further configured to output an inference result representing whether or not an object that is a recognition object is present in the input image based on the maximum feature amount.

18. The inference apparatus according to claim 17, wherein the processing circuitry is further configured to:

compare each of the M feature amounts and a threshold with each other for every two comparisons or more; and not release, from the memory, process data corresponding to a feature amount equal to or larger than the threshold among (M−1) or less feature amounts not having been selected for every two comparisons or more.

19. The inference apparatus according to claim 18, wherein the processing circuitry is further configured to output the inference result based on the maximum feature amount and a feature amount equal to or larger than the threshold.

20. An image processing method, comprising:

generating, for N processed images based on an input image, N being an integer equal to greater than 3, N feature amounts by performing feature amount extraction processing using a neural network;

storing process data generated during the feature amount extraction processing in a memory;

selecting a maximum feature amount by performing two or more comparisons with M combinations among the N feature amounts, M being an integer equal to 2 or more and (N−1) or less; and releasing (M−1) or less pieces of process data that correspond to (M−1) or less feature amounts not having been selected from the memory for each of the two or more comparisons.

* * * * *